(12) United States Patent
Joh et al.

(10) Patent No.: US 8,355,914 B2
(45) Date of Patent: Jan. 15, 2013

(54) MOBILE TERMINAL AND METHOD FOR CORRECTING TEXT THEREOF

(75) Inventors: Jae-Min Joh, Gunpo (KR); Jae-Do Kwak, Seoul (KR); Jong-Keun Youn, Gunpo (KR)

(73) Assignee: LG Electronics Inc., Seoul (KR)

( * ) Notice: Subject to any disclaimer, the term of this patent is extended or adjusted under 35 U.S.C. 154(b) by 895 days.

(21) Appl. No.: 12/425,918

(22) Filed: Apr. 17, 2009

(65) Prior Publication Data

US 2009/0299730 A1 Dec. 3, 2009

(30) Foreign Application Priority Data

May 28, 2008 (KR) .................. 10-2008-0049897

(51) Int. Cl.
- *G10L 15/00* (2006.01)
- *H04M 1/64* (2006.01)
- *B41J 5/00* (2006.01)
- *G06F 3/048* (2006.01)

(52) U.S. Cl. ........ 704/235; 704/252; 704/240; 704/256; 704/251; 715/816; 400/489; 379/67.1

(58) Field of Classification Search .................. 704/270, 704/235

See application file for complete search history.

(56) References Cited

U.S. PATENT DOCUMENTS

| | | | |
|---|---|---|---|
| 6,195,637 B1 | 2/2001 | Ballard et al. | |
| 6,208,713 B1* | 3/2001 | Rahrer et al. | 379/67.1 |
| 6,249,763 B1* | 6/2001 | Minematsu | 704/252 |
| 6,269,335 B1* | 7/2001 | Ittycheriah et al. | 704/270 |
| 6,728,676 B1* | 4/2004 | Ortega | 704/270 |
| 6,963,837 B1* | 11/2005 | Finke et al. | 704/256 |
| 7,191,119 B2* | 3/2007 | Epstein et al. | 704/10 |
| 7,315,818 B2* | 1/2008 | Stevens et al. | 704/235 |
| 7,493,339 B2* | 2/2009 | Nishimura et al. | 1/1 |
| 7,643,985 B2* | 1/2010 | Horvitz | 704/2 |
| 7,941,316 B2* | 5/2011 | Mahajan et al. | 704/235 |
| 7,949,533 B2* | 5/2011 | Braho et al. | 704/270 |
| 8,060,839 B2* | 11/2011 | Min et al. | 715/816 |
| 8,147,154 B2* | 4/2012 | Jawerth et al. | 400/489 |
| 2002/0128833 A1 | 9/2002 | Steinbiss | |
| 2004/0039989 A1* | 2/2004 | Warren | 715/505 |
| 2006/0074687 A1* | 4/2006 | Bickel et al. | 704/275 |
| 2007/0118399 A1* | 5/2007 | Avinash et al. | 705/2 |
| 2008/0040095 A1* | 2/2008 | Sinha et al. | 704/2 |

(Continued)

FOREIGN PATENT DOCUMENTS

EP 0957470 A2 11/1999

(Continued)

*Primary Examiner* — James S. Wozniak
*Assistant Examiner* — Neeraj Sharma
(74) *Attorney, Agent, or Firm* — Birch, Stewart, Kolasch & Birch, LLP

(57) ABSTRACT

A method for selecting text created in a mobile terminal by word and correcting it or changing it to another word, and a mobile terminal implementing the same are disclosed. The mobile terminal includes: a display unit to display one or more words of text, and to display tags for each of the one or more words; an input unit to select at least one of the tagged one or more words as selected one word; and a controller to display candidate words having a similar pronunciation to that of the word selected via the input unit, select one of the candidate words as selected one candidate word, and change the selected one word from the text to the selected one candidate word.

19 Claims, 24 Drawing Sheets

U.S. PATENT DOCUMENTS

| | | | |
|---|---|---|---|
| 2008/0086458 A1* | 4/2008 | Robinson et al. | 707/3 |
| 2009/0271199 A1* | 10/2009 | Agapi et al. | 704/251 |
| 2011/0035209 A1* | 2/2011 | Macfarlane | 704/9 |
| 2011/0184735 A1* | 7/2011 | Flaks et al. | 704/240 |

FOREIGN PATENT DOCUMENTS

| | | |
|---|---|---|
| EP | 1657709 A1 | 5/2006 |
| WO | WO 98/34217 A1 | 8/1998 |
| WO | WO 2007/101089 A1 | 9/2007 |

* cited by examiner

MOBILE TERMINAL AND METHOD FOR CORRECTING TEXT THEREOF

CROSS REFERENCE TO RELATED APPLICATIONS

The present application claims priority to Korean Application No. 10-2008-0049897 filed in Korea on May 28, 2008, the entire contents of which is hereby incorporated by reference in its entirety.

BACKGROUND OF THE INVENTION

1. Field of the Invention

The present invention relates to a method for selecting to correct text created in a mobile terminal by word or changing it to a different word, and a mobile terminal having the same.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. In terms of design, folder type, slide type, bar type, or rotation type design may be applied for mobile terminals.

In addition, efforts for applying a voice recognition function to mobile terminals are being made. For example, an STT (Speech To Text) function that converts voice into text allows a user to simply input text to thus easily create a text message in a mobile terminal. However, an always perfect voice recognition cannot be expected and erroneously recognized text may be outputted. Thus, in order to correct the erroneously recognized text, the user should move a cursor to the erroneously recognized text and correct the text one letter by one letter.

SUMMARY OF THE INVENTION

Accordingly, one object of the present invention is to address the above-noted and other problems.

Another object of the present invention is to provide a method for selecting text created in a mobile terminal by word and correcting it or changing it to another word, and a mobile terminal implementing the same.

Still another object of the present invention is to provide a method for tagging and displaying text created in a mobile terminal so that the tagged text can be selected by word, and a mobile terminal implementing the same.

Yet another object of the present invention is to provide a method for selecting text created in a mobile terminal by word by using voice or by using a plurality of input units, and a mobile terminal implementing the same.

Another object of the present invention is to provide a method for displaying candidate words having a similar pronunciation to that of a particular word selected from text created in a mobile terminal and changing the selected word to one of the candidate words.

To achieve these and other advantages and in accordance with the purpose of the present invention, as embodied and broadly described herein, the present invention provides in one aspect a mobile terminal including: a display unit configured to display one or more words of text and to display tags for each of the one or more words; an input unit configured to select at least one of the tagged one or more words as a selected one word; and a controller configured to control display of candidate words having a similar pronunciation to that of the selected one word that is selected via the input unit, select one of the candidate words, and change the selected word to the selected one candidate word.

To achieve these and other advantages and in accordance with the purpose of the present invention, as embodied and broadly described herein, the present invention provides in another aspect a method for correcting text of a mobile terminal including: converting a voice message received from a user into text; tagging the converted text by each of one or more words of the text; selecting at least one of the one or more words from the text as a selected on word; displaying candidate words having a similar pronunciation to that of the selected one word; and when one of the candidate words is selected as a selected candidate word, changing the selected one word from the text into the selected candidate word.

To achieve these and other advantages and in accordance with the purpose of the present invention, as embodied and broadly described herein, the present invention provides in another aspect a mobile terminal including a display unit configured to display a plurality of words of text, wherein each of the plurality of the words is individually tagged for identification; an input unit configured to receive input from a user; and a controller to replace a selected one of the plurality of words of the text based on the input from the user via the input unit, by using one of candidate words having a similar pronunciation to that of the selected one word.

The mobile terminal according to the present invention has an effect that it can simply select text converted after recognizing a voice by word, and can correct it or change it to a different word.

The mobile terminal according to the present invention has an effect that it can tag text converted after recognizing a voice and display it by word, so that words can be simply selected.

The mobile terminal according to the present invention has an effect that a particular word can be selected from text converted after recognizing a voice, by using a voice or by using a plurality of input units.

The mobile terminal according to the present invention has an effect that candidate words having a similar pronunciation to that of a particular word selected from text converted after recognizing a voice are displayed, and the selected word is changed to one of the candidate words.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus, are not limitative of the present invention, and wherein.

DETAILED DESCRIPTION OF THE INVENTION

Figure 1:
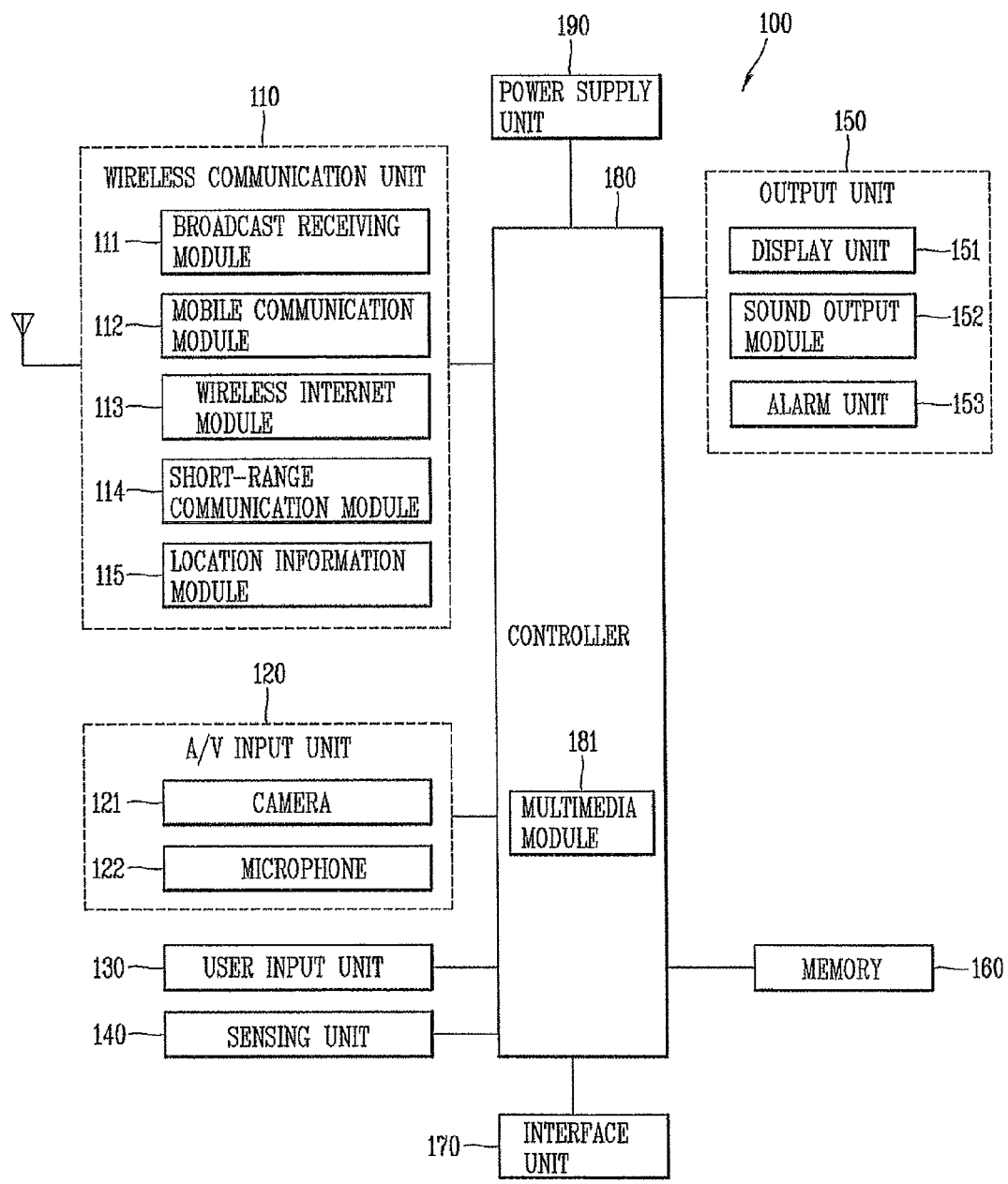
FIG. 1 is a schematic block diagram of a mobile terminal implementing an embodiment of the present invention.

Reference will now be made in detail to some exemplary embodiments of the present invention, examples of which are illustrated in the accompanying drawings. In describing the present invention, if a detailed explanation for a related known function or construction is considered to unnecessarily divert the gist of the present invention, such explanation has been omitted but would be understood by those skilled in the art. In describing the present invention with reference to the accompanying drawings, the same reference numerals may be used for elements performing the same or similar functions. The mobile terminal according to an embodiment of the present invention will now be described in detail with reference to the accompanying drawings.

FIG. 1 is a block diagram of a mobile terminal according to an embodiment of the present invention. The mobile terminal may be implemented in various configurations or forms. Examples of such mobile terminal includes mobile phones, user equipment, smart phones, computers, digital broadcast terminals, personal digital assistants, portable multimedia players (PMP), navigation devices, and the like.

The mobile terminal 100 as shown in FIG. 1 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal 100 having various components, but it is understood that implementing all of the illustrated components is not a requirement. Greater or fewer components thereof may alternatively be implemented.

The elements of the mobile terminal will be described in detail as follows. A wireless communication unit 110 typically includes one or more components allowing radio communication between the mobile terminal 100 and a wireless communication system or a network in which the mobile terminal 100 is located. A broadcast receiving module 111 receives broadcast signals and/or broadcast associated information from an external broadcast management server (or other network entity) via a broadcast channel. The broadcast channel may include a satellite channel and a terrestrial channel. The broadcast managing server may refer to a system that generates and transmits a broadcast signal and/or broadcast associated information, or a server that receives a previously generated broadcast signal and/or broadcast associated information, and transmits the same to a terminal. Examples of the broadcast associated information may include information regarding a broadcast channel, a broadcast program, a broadcast service provider, etc. The broadcast signal may include a TV broadcast signal, a radio broadcast signal, a data broadcast signal, and the like. Also, the broadcast signal may further include a broadcast signal combined with a TV or radio broadcast signal.

The broadcast associated information may be provided also via a mobile communication network (e.g., that operate according to standards such as 3GPP, 3GPP2, IEEE, CDMA, GSM, OMA, so-called 4G techniques, etc.) and, in this case, the broadcast associated information may be received by a mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 is configured to be suitable for an every broadcast system that provides a broadcast signal as well as the above-mentioned digital broadcast systems. Broadcast signals and/or broadcast-associated information received via the broadcast receiving module 111 may be stored in the memory 160 (or other type of storage medium).

The mobile communication module 112 transmits and/or receives radio signals to and/or from at least one of a base station (e.g., access points, Node Bs, etc.), an external terminal (e.g., other user devices) and a server (or other network entities). Such radio signals may include a voice call signal, a video call signal or various types of data according to text and/or multimedia message transmission and/or reception.

The wireless Internet module 113 supports Internet access for the mobile terminal. This module may be internally or externally coupled to the mobile terminal 100. The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal 100 according to trigonometry (or triangulation) based on three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

The A/V input unit 120 is configured to receive an audio or video signal. The A/V input unit 120 may include a camera 121 (or other image capture device) and a microphone 122 (or other sound pick-up device). The camera 121 processes image data of still pictures or videos obtained by an image capture device in a video capturing mode or an image capturing mode. The processed image frames may be displayed on a display unit 151 (or other visual output device). The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may include various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc.), a jog wheel, a jog switch, and the like. In particular, when the touch pad is overlaid on the display unit 151 in a layered manner, it may be called a touch screen.

The sensing unit 140 (or other detection means) detects a current status (or state) of the mobile terminal 100 such as an opened or closed state of the mobile terminal 100, a location of the mobile terminal 100, a presence or absence of user contact (i.e. touch inputs) with the mobile terminal 100, orientation of the mobile terminal 100, an acceleration or deceleration movement and direction of the mobile terminal 100, etc., and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface with at least one external device connected with the mobile terminal 100. For example, the external devices may include wired or wireless headset ports, external power supply (or battery charger) ports, wired or wireless data ports, memory card ports, ports for connecting a device having an identification module, audio input/output (I/O) ports, video I/O ports, earphone ports, or the like.

Here, the identification module may be a chip (or other element with memory or storage capabilities) that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile terminal 100 or may be used to transfer data between the mobile terminal and an external device. The output unit 150 is configured to provide outputs in a visual, audible, and/or tactile manner (e.g., audio signal, video signal, alarm signal, vibration signal, etc.). The output unit 150 may include the display unit 151, an audio output module (or sound output module) 152, an alarm unit 153, and the like.

The display unit 151 may output information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display units (or other display means) according to its embodiment. For example, the mobile terminal may include an external display unit (that can be viewed even if the mobile phone is closed) and an internal display unit (that can be viewed if the mobile phone is opened).

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, or other sound generating device.

The alarm unit 153 (or other type of user notification means) may provide outputs to inform about an occurrence of an event of the mobile terminal 100. Typical events may include call reception, message reception, key or button inputs, etc. In addition to audio or video outputs, the alarm unit 153 may provide outputs in a different manner to inform about an occurrence of an event. For example, the alarm unit 153 may provide outputs in the form of vibrations (or other tactile outputs). When a call, a message, or some other incoming communication is received, the alarm unit 153 may provide tactile outputs (i.e., vibrations) to inform the user. By providing tactile outputs, the user can recognize the occurrence of various events even if his mobile phone is in his pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been input or to be outputted. The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal 100. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separated from the controller 180. The power supply unit 190 receives external power (via a power cable connection) or internal power (via the battery of the mobile phone) and supplies appropriate power required for operating respective elements and components under the control of the controller 180.

Various embodiments described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3. Mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
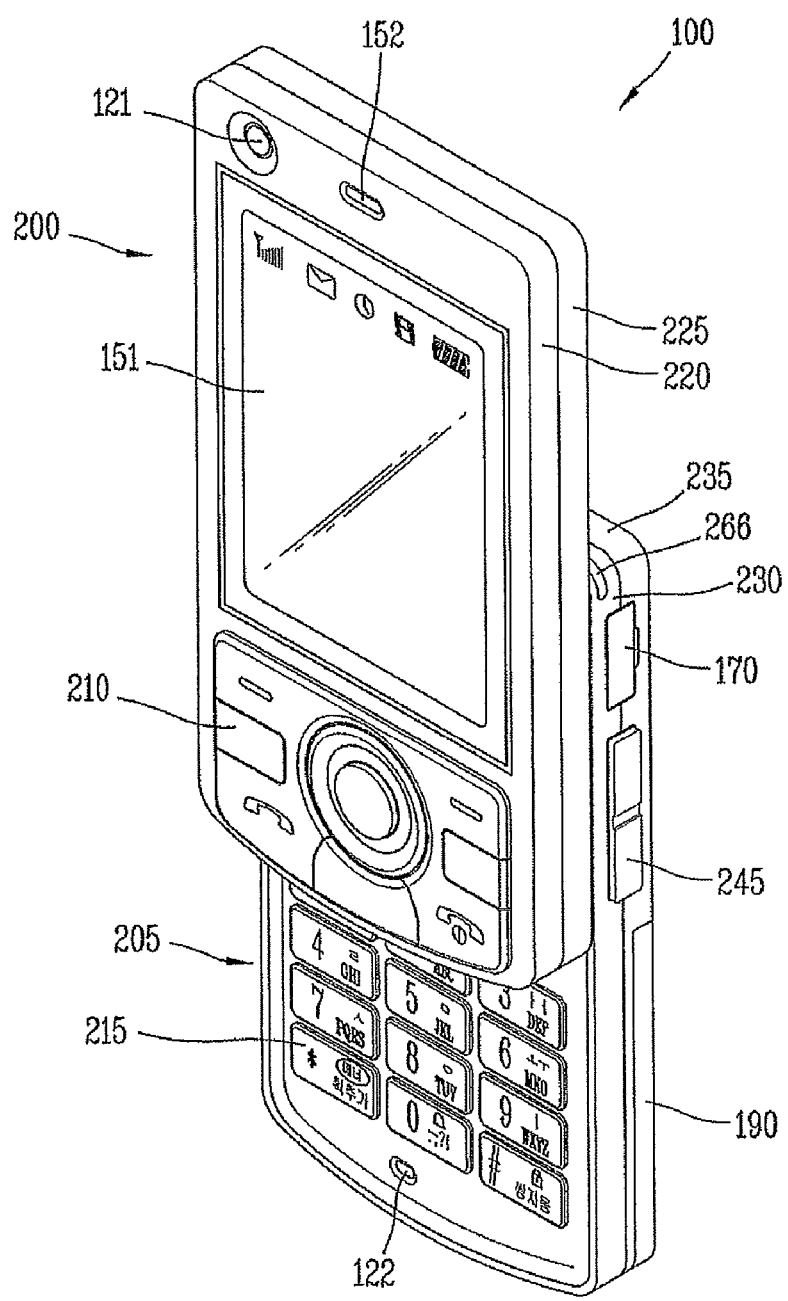
FIG. 2 is a front perspective view of a mobile terminal implementing an embodiment of the present invention.

FIG. 2 is a front perspective view of the mobile terminal according to an embodiment of the present invention. Such mobile terminal may include a first body 200 and a second body 205 that can be slidably moved along at least one direction with respect to the first body 200. A state in which the first body is disposed to overlap with the second body 205 may be called a closed configuration, and as shown in FIG. 2, a state in which at least a portion of the second body 205 is exposed may be called an open configuration. In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225. The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body, 200, specifically, on the first front case 220 of the first body 200. The display unit 151 may include an LCD (Liquid Crystal Display), an OLED (Organic Light Emitting Diode), and the like, that visually displays information. A touch pad may be overlaid in a layered manner on the display unit 151 to allow the display unit 151 to function as a touch screen to input information via user gestures or touch inputs. User touch inputs may also be achieved by so-called proximity detection techniques, whereby the user's finger or stylus may be detected when placed near the screen without actually touching the screen itself.

The audio output unit 152 may be implemented in the form of a speaker or other sound producing device. The camera 121 may be implemented to be suitable for capturing images or video with respect to the user and other objects.

Like the first body 200, the case constituting the external appearance of the second body 205 may include a second front case 230 and a second rear case 235. A second user input unit 215 may be disposed at a front portion of the second body 205, specifically, on the second front case 230. A third user input unit 245, the microphone 122, the interface unit 170 may be disposed on at least one of the second front case 230 and the second rear case 235.

The first to third user input units 210, 215 and 245 may be generally referred to as a manipulating unit 130, and various methods and techniques can be employed for the manipulation unit 130 so long as they can be operated by the user in a tactile manner. For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like. In terms of their functions, the first user input unit 210 is used for inputting (entering) commands such as start, end, scroll or the like, and the second user input unit 215 is used for inputting (entering) numbers, characters, symbols, or the like. Also, the third user input unit 245 may support the so-called hot key functions that allow more convenient activation of particular functions for the mobile terminal. The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. For example, the interface unit 170 may be implemented in the form of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like. Also, the interface unit 170 may be a card socket for accommodating a SIM (Subscriber Identification Module) card or a UIM (User Identity Module) card, or an external card such as a memory card for storing information. The power supply unit 190 for supplying power to the terminal may be located at the second rear case 235. The power supply unit 190 may be, for example, a rechargeable battery that can be detached.

Figure 3:
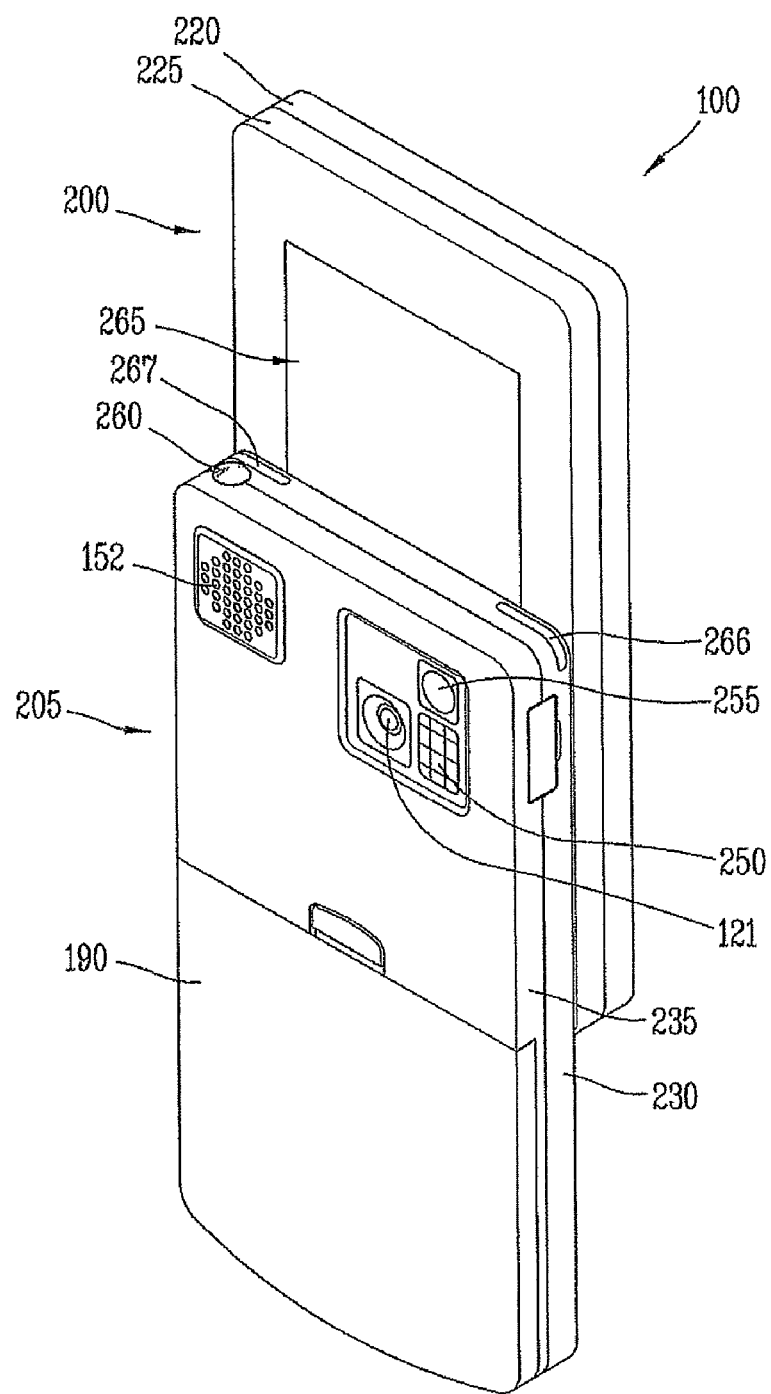
FIG. 3 is a rear perspective view of a mobile terminal implementing an embodiment of the present invention.

FIG. 3 is a rear perspective view of the mobile terminal of FIG. 2 according to an exemplary embodiment. As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera 121 of the first body 200 may operate with a relatively lower resolution to capture an image(s) of the user's face and immediately transmit such image(s) to another party in real-time during video call communication or the like in which reverse link bandwidth capabilities may be limited. Also, the camera 121 of the second body 205 may operate with a relatively higher resolution to capture images of general objects with high picture quality, which may not require immediately transmission in real-time, but may be stored for later viewing or use. Additional camera related components, such as a flash 250 and a mirror 255, may be additionally disposed adjacent to the camera 121 of the second body 205. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 may support stereophonic sound functions in conjunction with the audio output module 152 of the first body 200 and may be also used for sending and receiving calls in a speaker phone mode. A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200. The other part of the slide module 265 may be disposed on the second front case 230 of the second body 205, which may not be exposed as shown in FIG. 3.

The second camera 121 and other components may be disposed on the second body 205, but such configuration is not meant to be limited. For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration of the mobile terminal 100. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems. Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
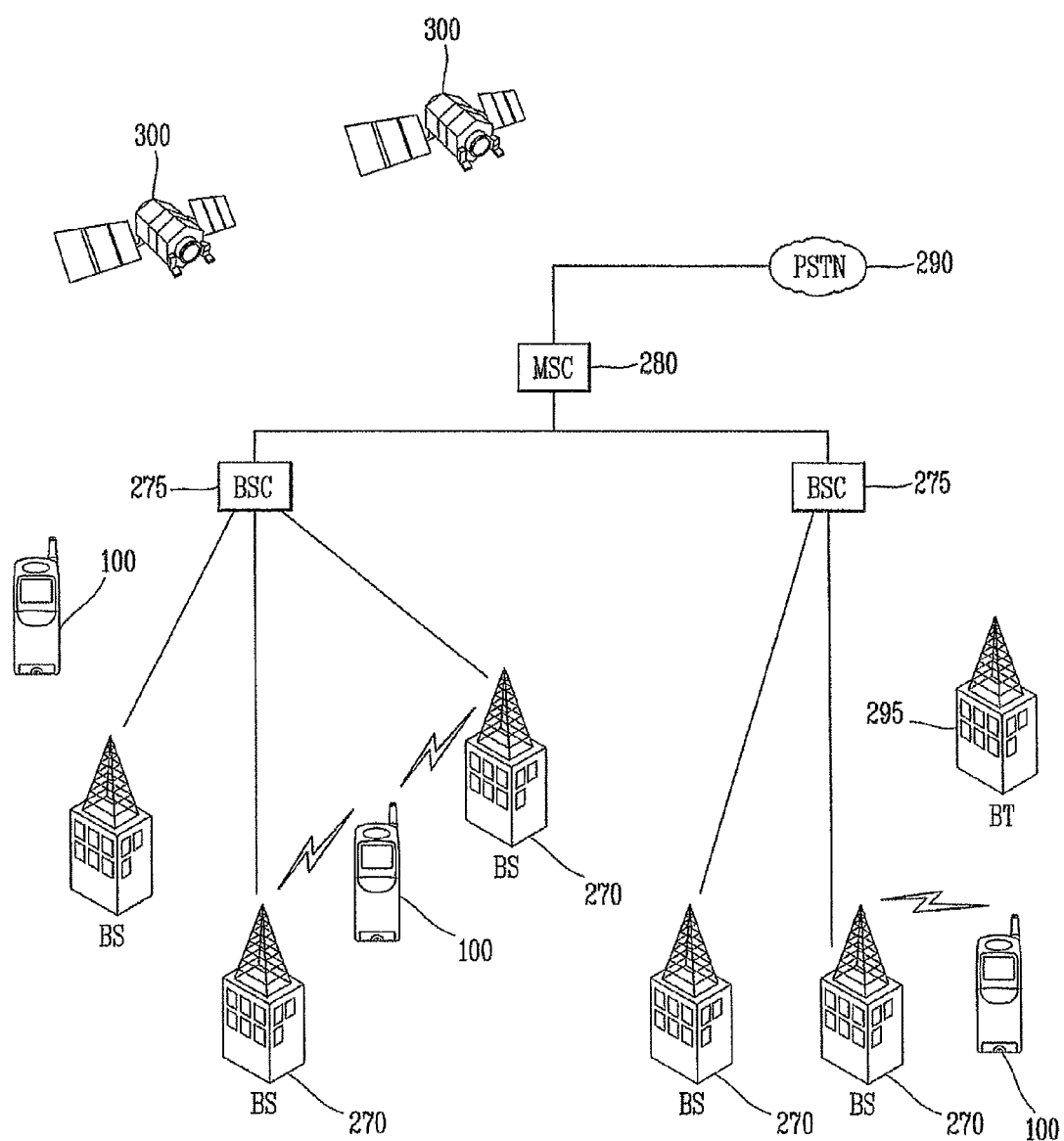
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc). The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 4, several global positioning systems (GPS) satellites 300 are shown. The satellites 300 help locate at least one of a plurality of terminals 100. In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

The mobile terminal according to the embodiment of the present invention includes an algorithm for a voice recognition and an algorithm for an STT (Speech To Text) stored in the memory 160, and a voice inputted by a user can be converted into text by associating an arbitrary function provided in the mobile terminal, the voice recognition function and the STT function. The converted text may be outputted to an execution screen of the function. Here, the particular function may include a function of creating text for a text message or a mail. When the text message or mail creating function is executed, the controller 180 may activate the voice recognition function and automatically operate the STT function.

Figure 5:
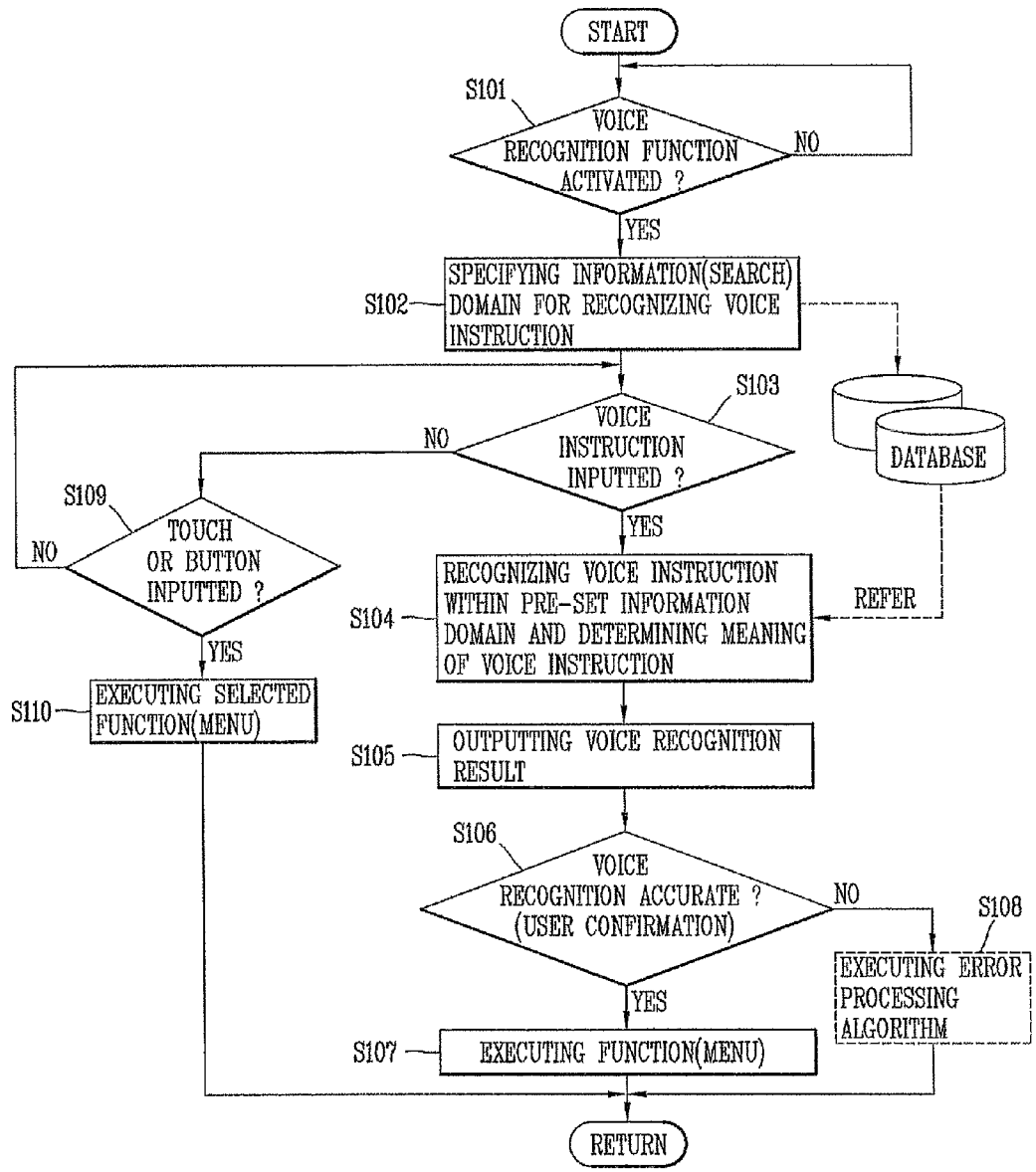
FIG. 5 is a flow chart illustrating the process of a method for controlling a menu of the mobile terminal by using a voice according to an embodiment of the present invention.

FIG. 5 is a flow chart illustrating the process of a method for controlling a menu of the mobile terminal by using a voice according to an embodiment of the present invention. The controller 180 of the mobile terminal may start activation of the voice recognition function upon receiving an activation control signal (S101). The activation control signal may be used to terminate the activated voice recognition function.

The activation control signal may be generated by manipulating a particular hardware button provided in the terminal, a software button displayed on the display unit 151, by applying a touch, or by manipulating a particular menu displayed on the display unit 151. Or, the activation control signal may be generated by a particular sound, a short distance radio signal or a remote radio signal, or even by human body movement information including a motion of the hand or gesture of the user. The particular sound may include a sort of an impact sound of a particular level or higher such as a clapping sound. The sound of the particular level or higher can be detected by using a simple sound level detection algorithm (not shown).

The sound level detection algorithm may be relatively simple compared with a voice recognition algorithm, consuming a smaller amount of resources of the mobile terminal. The sound level detection algorithm (or circuit) may be configured separately from the voice recognition algorithm (or circuit), or may be implemented to restrict a partial function of the voice recognition algorithm.

The radio signal may be received via the wireless communication unit 110, and the user's motion of hand or gesture may be received via the sensing unit 140. The wireless communication unit 110 for receiving the activation control signal, the user input unit 130, and the sensing unit 140 may be collectively called a signal input unit.

When the voice recognition function is activated, the controller analyzes context or content of voice data or a voice instruction received via the microphone 122 with reference to a particular database, to determine the meaning of the voice instruction (S103, S104). Here, as the voice recognition function is activated, an information domain of the database referred to recognize the meaning of the voice instruction may be specified to information related to a particular function or menu (S102). For example, the specified information domain may be specified to information related to menus currently outputted on the display unit 151 or information related to sub-menus of a particular menu selected from the menus. Because the information domain of the database to be referred to recognize the voice instruction is specified, a recognition rate of the voice instruction can be further increased.

The information related to the sub-menus may be configured as a database. The information may have a key word form, and a plurality of information may correspond to one function or one menu. A plurality of databases may be configured according to the characteristics of information and may be stored in the memory 160. The information configured in each database may be updated through learning. In addition, in order to improve the recognition rate of the voice instruction, the information of each database may be specified to information related to a currently outputted function or menus. The information domain may be changed as the depth of menus is increased.

The operation for determining the meaning of the voice instruction may be started immediately when the activated voice recognition function is terminated after the inputted voice instruction is temporarily stored, or may be performed simultaneously when a voice instruction is inputted in a state that the voice recognition function is activated.

Meanwhile, although the voice recognition function is in an active state, the controller may continuously drive an algorithm for detecting a touch or a button input. Thus, even in the state that the voice recognition function is activated, the controller 180 can select or execute a particular menu via any other input unit such as a touch or a button than the voice instruction (S109, S110). When the meaning of the voice instruction is determined, the controller 180 may output the corresponding result (S105). The result may include a control signal for executing a menu related to a function or a service corresponding to the meaning of the voice instruction or controlling a particular element of the terminal, or data displaying information related to the recognized voice instruction.

When the result is outputted or executed, the controller 180 may receive a user's configuration as to whether or not the result is correct (S106). For example, if the voice instruction has a low recognition rate or recognized to have a plurality of meanings, the controller 180 outputs a plurality of menus related to each meaning, and execute them according to a user selection. Or, the controller may simply inquire whether to execute a particular menu with a high recognition rate, and execute or display a corresponding function or menu according to a user selection or response.

Whether to execute the particular menu may be confirmed to the user by outputting a message or a voice (e.g., want to execute a text message creation function? Please say Yes or No. With no response, text message creation function will be executed automatically in five seconds). Accordingly, the user may respond (e.g., 1: Yes, 2: No) by using a voice or other input units, and the other input unit may include a hardware button or a software button, or in a touch. If there is no response from the user, the controller 180 may determine it as a positive response and automatically execute the function or menu (S107). If the user's response is negative, namely, if the meaning of the voice instruction is not accurately determined, an error processing process may be performed (S108).

In the error processing process, the voice instruction is received again or a plurality of menus (or a plurality of menus interpreted to have a similar meaning) of a particular recognition rate or higher are displayed, and then, one of them may be selected by the user. If the number of functions or menus having the particular recognition rate or higher is smaller than a particular number (e.g., two), the function or the menu may be automatically executed.

Figure 6A:
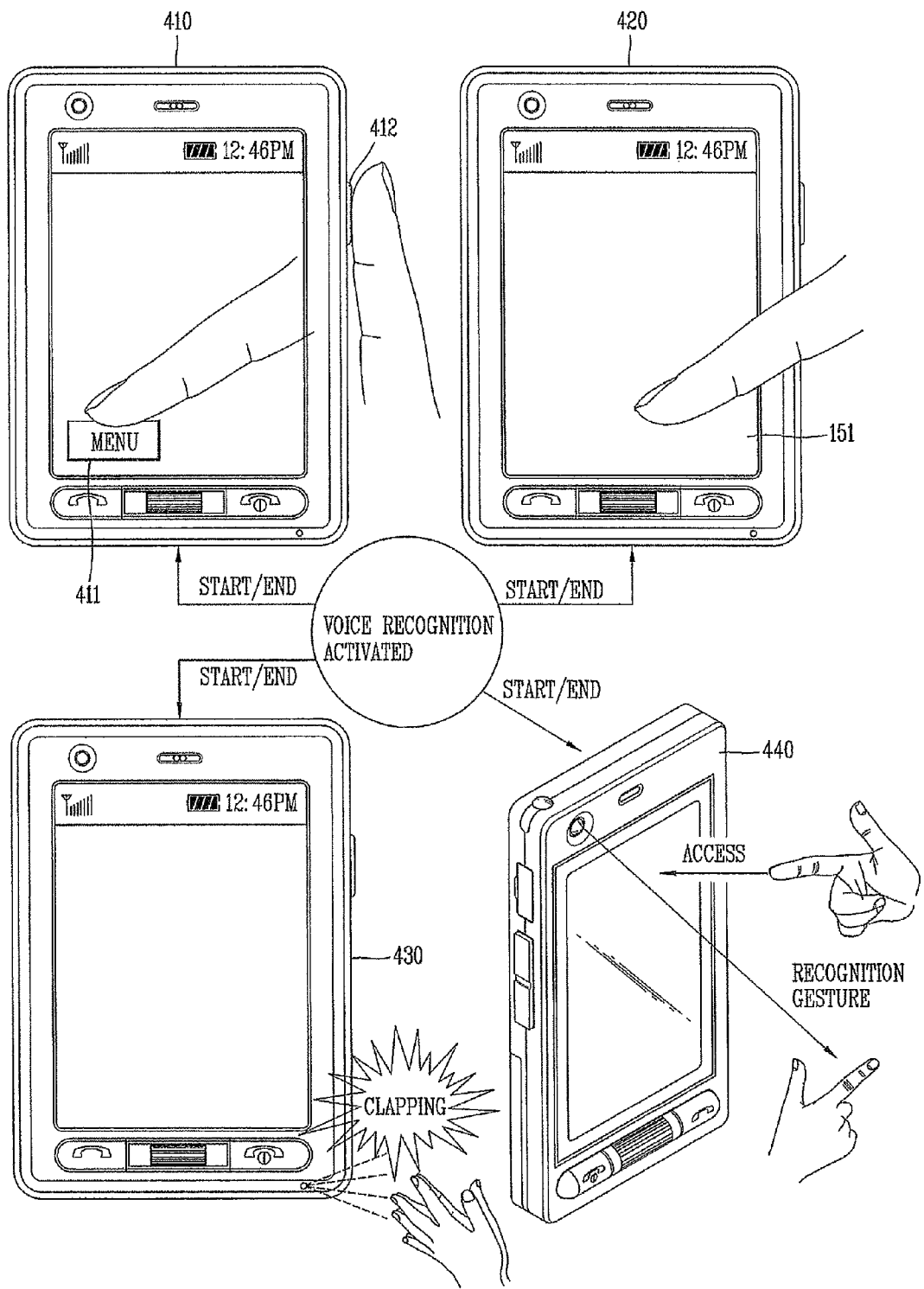
FIG. 6A is an overview of display screens illustrating a method for activating a voice recognition function of the mobile terminal according to an embodiment of the present invention.

FIG. 6A is an overview of display screens illustrating a method for activating a voice recognition function of the mobile terminal according to an embodiment of the present invention. When the voice recognition function is maintained in the activated state, the voice recognition algorithm is continuously driven, increasing the resource and power consumption. Thus, in order to reduce unnecessary power or resource consumption of the mobile terminal, the start or termination of the activation of the voice recognition function should be controlled. In the present invention, an arbitrary button of the user input unit 130 may be used to control the activation (411).

The arbitrary button may be a hardware button, or a software button or an icon (411) displayed on the display unit 151. The software button includes a menu call button in a standby state. Namely, when the menu call button is inputted in the standby state, the controller 180 may activate the voice recognition function while outputting a menu list. In addition, if an arbitrary region of the display unit 151 where nothing is displayed (i.e., a region where a button or a menu icon is not displayed) is touched, the activation of the voice recognition function may be controlled by the controller (420).

If a sound of a particular level or higher is inputted, the controller 180 may control activation of the voice recognition function (430). For example, the voice recognition function may be driven in two types of modes. Namely, the voice recognition function may be driven in a first mode in which a sound of the particular level or higher is simply detected, and a second mode in which a voice instruction is recognized and its meaning is determined. When a sound of a particular level or higher is inputted in the first mode, the second mode may be activated to recognize the voice instruction. The activation of the voice recognition function may be controlled when a short-distance or remote radio signal or body movement information including the user's motion of hand or gesture is inputted (440).

As the voice recognition function is activated, the controller 180 may specify the information domain of a particular database that can be referred to for a voice recognition to information related to a menu list displayed on the display unit 151. If a particular menu is selected from the menu list or executed, the information domain of the database may be specified to information related to the selected menu or its sub-menus.

Figure 6B:
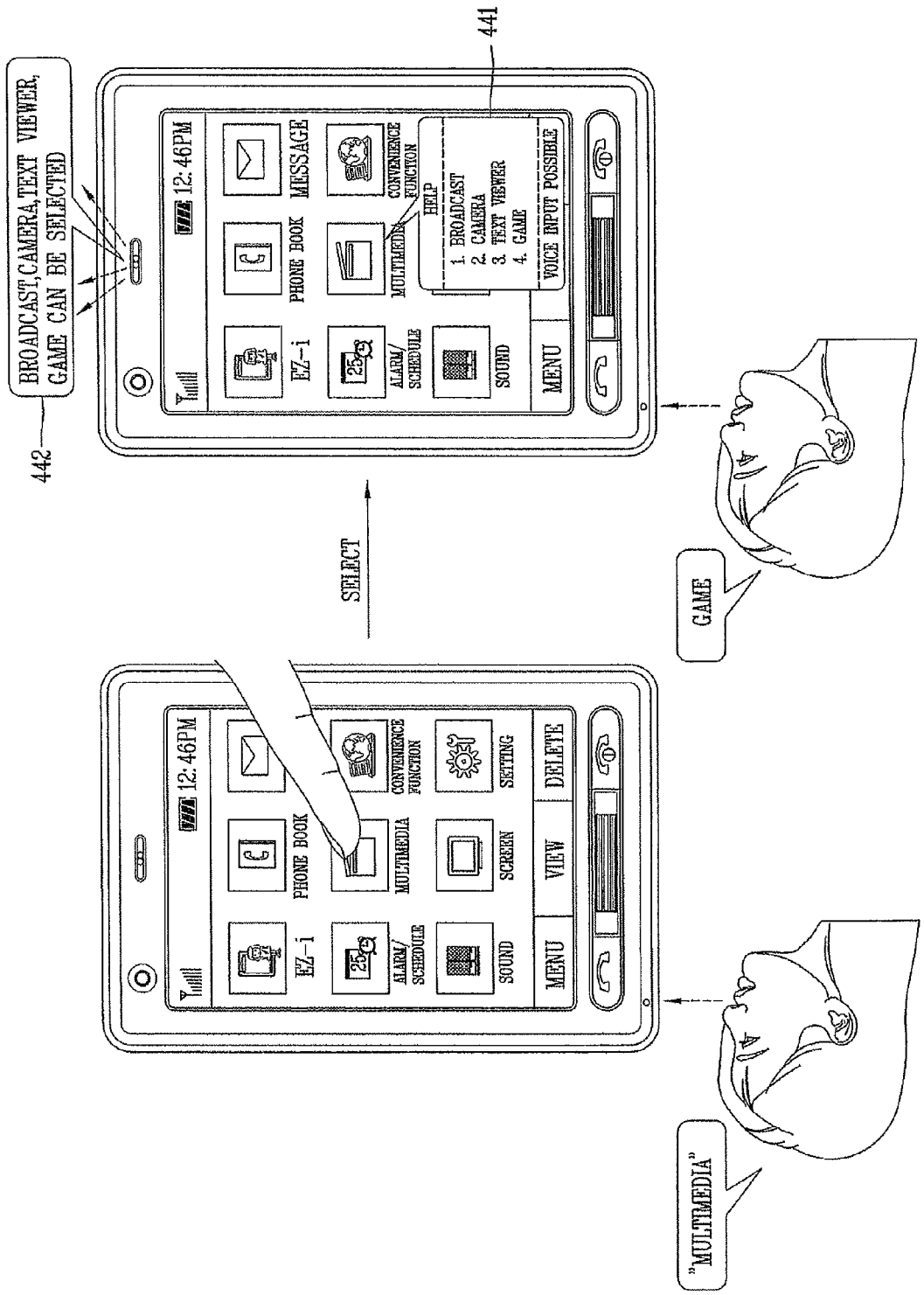
FIGS. 6B and 6C are overviews of display screens illustrating a method for outputting help information of the mobile terminal according to an embodiment of the present invention.
Figure 6C:
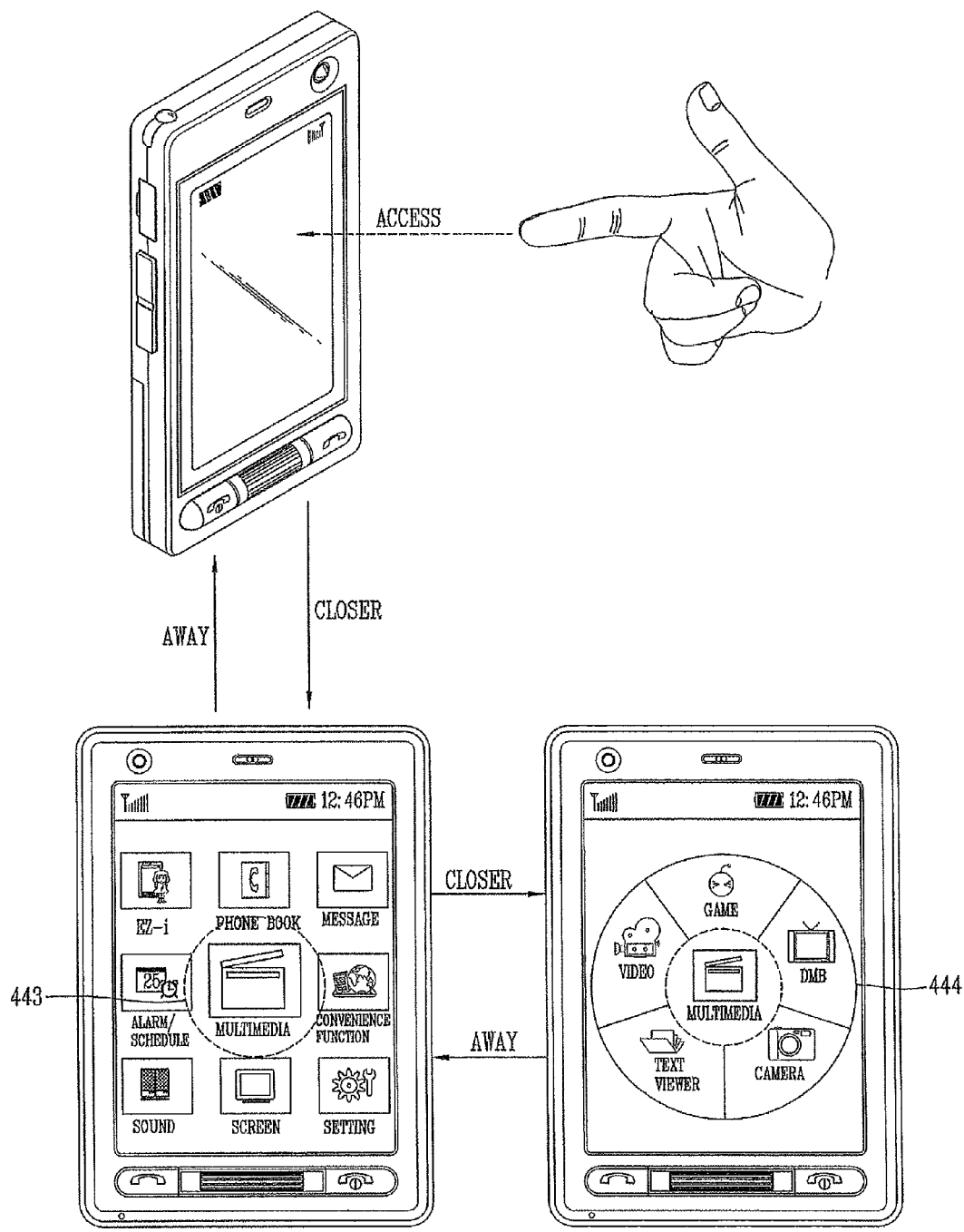

When the particular menu is selected or executed according to a voice instruction or a touch input, the controller 180 may output help information related to the sub-menus by voice or in the form of balloon help. For example, as shown in FIG. 6B, when a 'multimedia menu' is selected, information related to its sub-menus (e.g., broadcast, camera, text viewer, game, etc.) may be outputted as help information (441, 442). Or, as shown in FIG. 6C, when a user's finger approaches a particular menu 443 to select a particular menu, a sub-menu list 444 may be outputted. The transparency or brightness of the help information may be adjusted according to an access distance when displayed on the display unit 151.

After the activated state is maintained for a certain time, the controller may automatically terminate the activated state. In addition, the controller 180 may maintain the activated state only while a particular button or a touch is being inputted, and when the input is released, the controller 180 may terminate the activated state. Also, if a voice is not inputted for a certain time or longer after the activated state starts, the controller may automatically terminate the activated state.

Figure 7A:
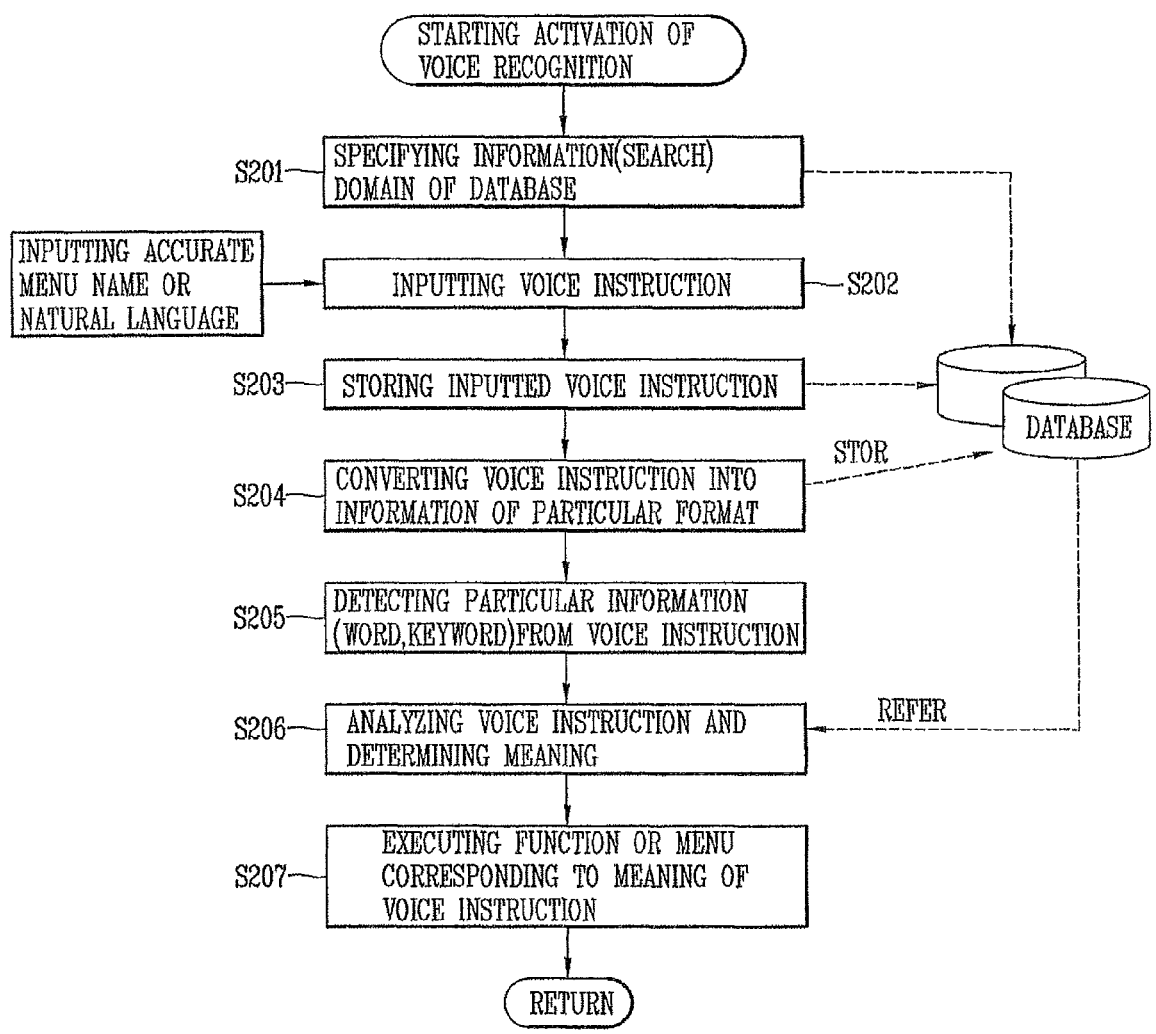
FIG. 7A is a flow chart illustrating the process of a method for recognizing a voice instruction of the mobile terminal according to an embodiment of the present invention.

FIG. 7A is a flow chart illustrating the process of a method for recognizing a voice instruction of the mobile terminal according to an embodiment of the present invention. As the voice recognition function is activated, the controller 180 may specify an information domain that can be referred to for a voice recognition to information related to menus displayed on the display unit 151, its sub-menus, or a currently executed function or menu (S201). A voice instruction received after the voice recognition function is activated may be stored in a particular database of the memory 160 (S202, S203).

When the voice instruction is received in the state that the information domain is specified, the controller 180 analyzes content and context of the voice instruction within the specified information domain of the database by using the voice recognition algorithm. In order to analyze the voice instruction, the voice instruction may be converted into text-type information, and the text-type information may be stored in a particular database of the memory 160 (S204). However, the voice instruction may not be necessarily converted into the text-type information.

In order to analyze the content and context, the controller 180 may detect a particular word or a key word included in the voice instruction (S205). The controller 180 may analyze content or context of the voice instruction and determine its meaning with reference to the information stored in the particular database based on the detected word or key word (S206).

The information domain of the referred database may be specified to an information domain related to a currently executed function or menu, and a function or a menu corresponding to the meaning of the voice instruction determined with reference to the database may be executed (S207). For example, on the assumption that the text message creation function is executed and then text is inputted by using the STT function, priority of the information domain for recognizing the voice instruction may be set to be instructions related to correction of the text or instructions related to searching the other party for a message transmission or related to transmission of a message. Because the information domain for a voice recognition is specified to the information related to the particular menus, the speed and recognition rate of the voice recognition can be improved and consumption of resources can be reduced.

Figure 7B:
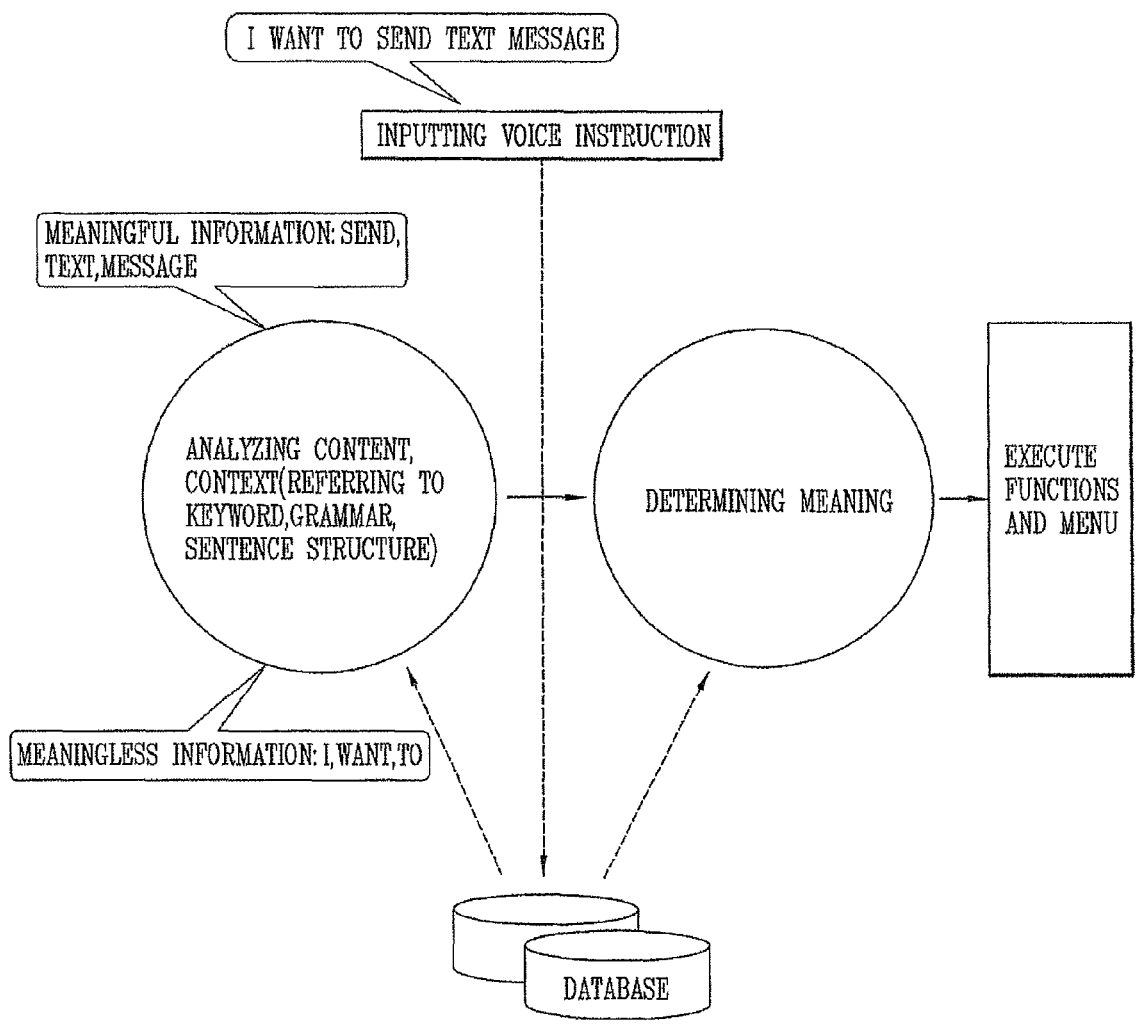
FIG. 7B is a view illustrating a voice recognition method of the mobile terminal according to an embodiment of the present invention.

The recognition rate may refer to a degree consistent to the name set in a particular menu. The recognition rate of the voice instruction may be determined by the number of pieces of information related to a particular function or menu among the information included in the voice instruction. Thus, the recognition rate of the voice instruction may be high if information precisely consistent to a particular function or menu is included in the voice instruction. For example, as shown in FIG. 7B, if the voice instruction in a natural language including six words (e.g., I want to send text message) is inputted, its recognition rate may be determined by the number of the meaningful words (e.g., 'send', 'text', 'message') related to a particular menu (e.g., text message). Whether or not the words included in the voice instruction are related to a particular function or menu may differ according to the information stored in the database. For example, in the voice instruction in the natural language (e.g., I want to send text message), meaningless words unrelated to the menu may be grammatically the subject (I) or the preposition (to).

Here, the natural language is a language generally used by people in daily life, which is discriminated from an artificial language which is artificially created, and can be processed by using a natural language processing algorithm. The natural language may or may not include an accurate name related to the particular menu, so it may be difficult to precisely recognize a voice instruction at a rate of 100%, virtually. Accordingly, if the recognition rate is higher than a particular value (e.g., 80%), it can be considered to be accurate. If there are a plurality of meanings having such recognition rate (namely, if a voice instruction that can be interpreted by several meanings, each with similar recognition rate, is inputted), corresponding menus are displayed and at least one function or menu may be executed according to a user selection.

Figure 8:
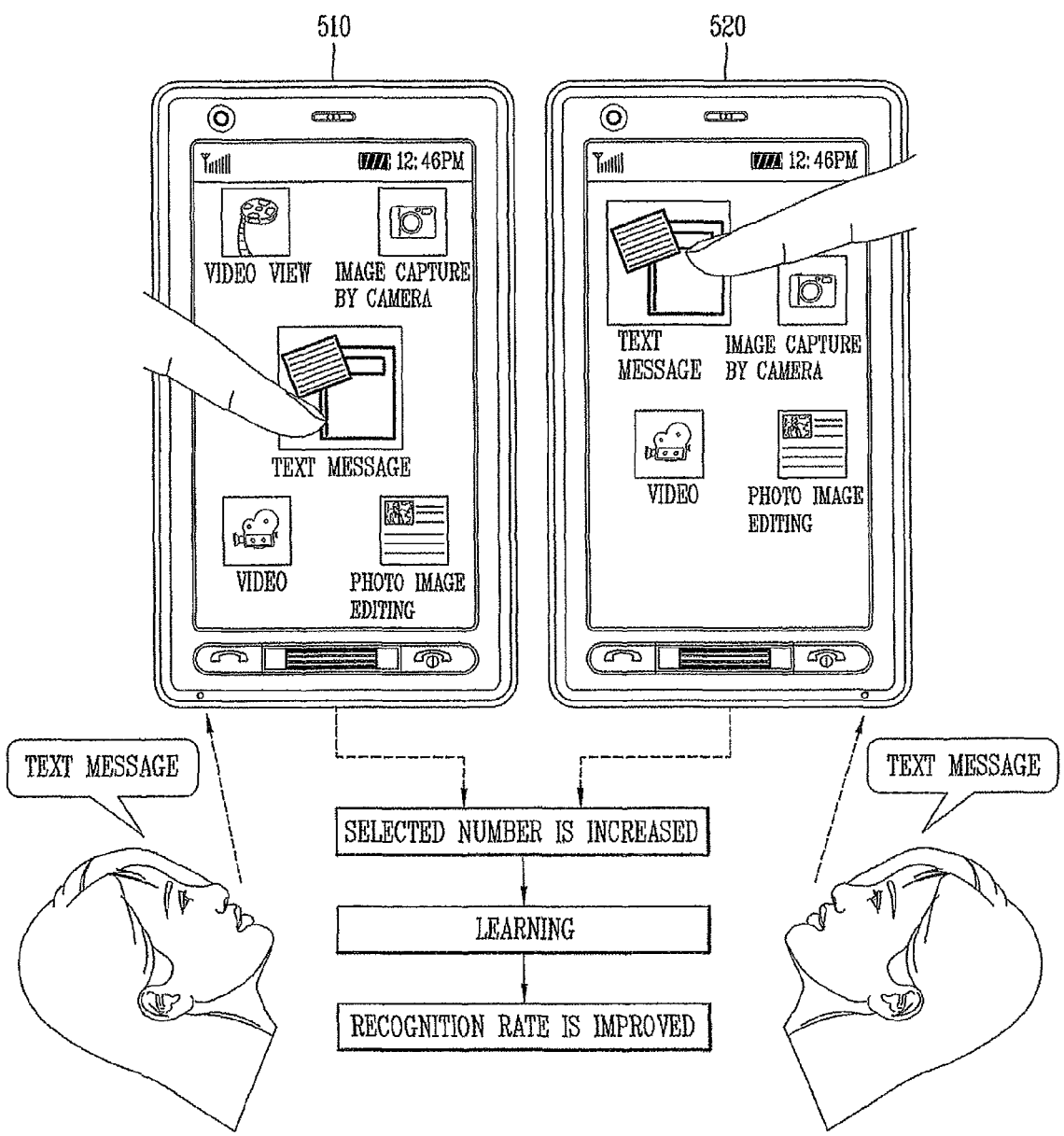
FIG. 8 is a view illustrating a method for displaying a menu according to a voice recognition rate of the mobile terminal according to the present invention.

In displaying the menus, the menus may be displayed in the order starting from a menu with the highest recognition rate. For example, as shown in FIG. 8, a menu icon having the highest recognition rate may be displayed to be closer to the center of the screen (510). Or, the menu icon having the highest recognition rate may be displayed to be larger or darker (520). Or, at least one of a size, a position, a color and a contrast of the plurality of menus may be differently displayed according to the order starting from the menu having the highest rate, or highlighted, or their transparency may be adjusted.

The recognition rate of a menu having a higher selection by the user among the plurality of displayed menus may be changed to be higher. Namely, as for the recognition rate, if a menu is frequently selected by the user, the number of its selections may be learned, and a recognition rate with respect to the selected menu may be changed. Thus, a recognition rate of a voice instruction inputted with the same or similar pronunciation or content afterwards may be changed.

Figure 9:
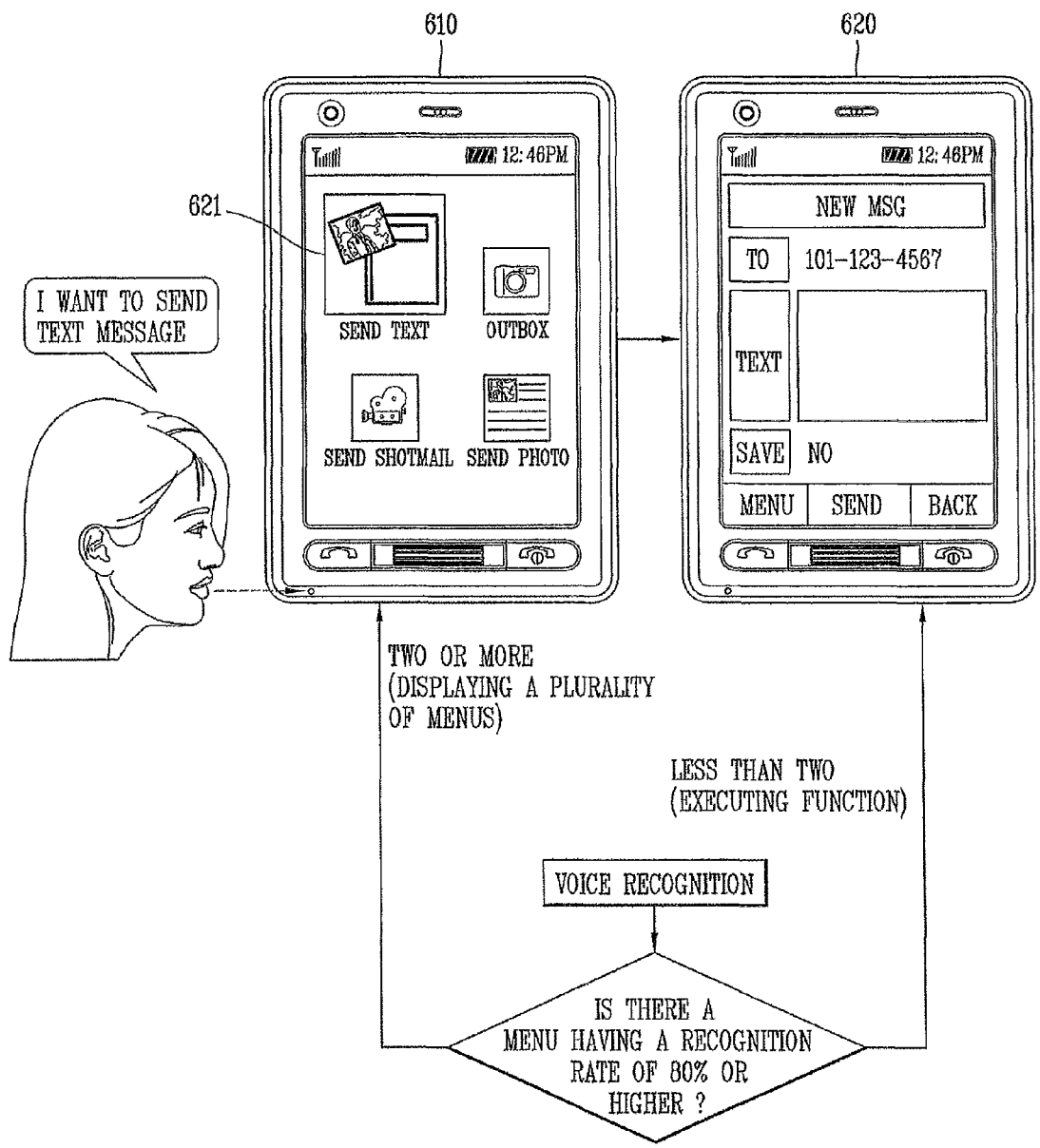
FIG. 9 is an overview of display screens illustrating a voice instruction recognition method of the mobile terminal according to an embodiment of the present invention.

FIG. 9 is an overview of display screens illustrating a voice instruction recognition method of the mobile terminal according to an embodiment of the present invention. On the assumption that the mobile terminal is in a standby state and a particular menu (e.g., message) is selected by the user in the standby state, the controller 180 displays sub-menus of the selected menu. And then, the controller 180 starts activating of the voice recognition function internally. As the voice recognition function starts to be activated, the controller 180 may set an information domain of the database for recognizing the voice instruction by specifying it to information related to the displayed sub-menus (610) according to a preset environment setting option.

With the sub-menus displayed, the controller 180 may receive a voice instruction, a touch or a button from the user and select a particular menu 621. When the particular menu 621 is selected, the controller 180 may display the sub-menus (620). With the sub-menu displayed (620), when the voice instruction in natural language (e.g., I want to send text message) is inputted, the controller 180 detects meaningful words or keywords (e.g., send, text, message) related to the particular function or menu, compares them with information related to the sub-menus in the particular database, and determines a meaning with the highest recognition rate. Then, the controller 180 executes a menu related to the determined meaning (e.g., send text).

In addition, if a particular menu is selected or executed according to a voice instruction or a touch input, the controller 180 may output help information related to sub-menus by voice or as a balloon help in the form of text, according to an operation state or an operation mode (e.g., a mode for guiding the voice recognition function) of the terminal.

The operation mode for outputting the help may be set according to an option related to the environment setting menu. Accordingly, in the present invention, menus related to a particular function or service can be controlled by inputting a button or a touch or by a voice instruction regardless of how the user is familiar or skilled with respect to the voice instruction.

Meanwhile, when the voice instruction is recognized with a plurality of meanings, namely, if the voice instruction in natural language does not include an accurate name of a menu, e.g., if a menu desired to be selected by a user from among 'send photo', 'send shotmail' and 'outbox' is not accurately determined, the controller 180 may display a plurality of menus having a recognition rate of a particular value (e.g., 80%) or higher. However, if menus of the particular value or higher is smaller than two, a corresponding function or menu may be automatically executed.

Figure 10:
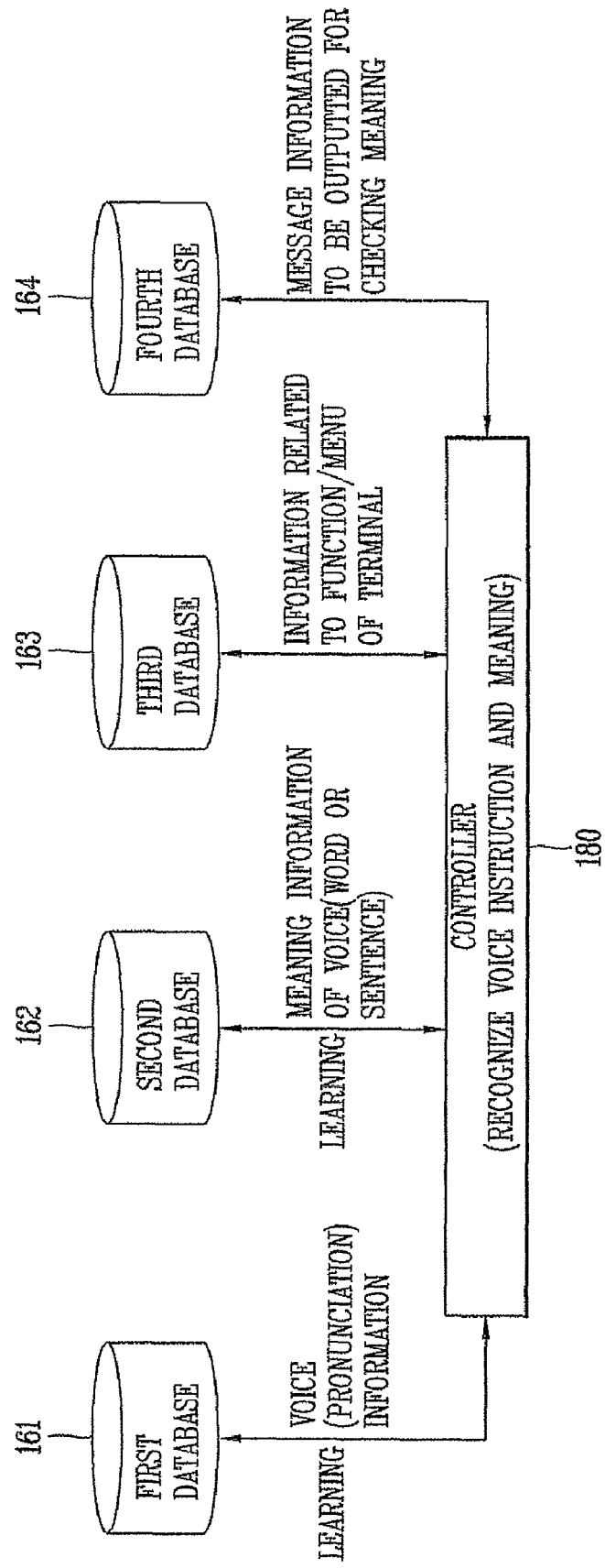
FIG. 10 is a block diagram illustrating a database system used in a voice recognition method of the mobile terminal according to an embodiment of the present invention.

FIG. 10 is a block diagram illustrating a database system used in a voice recognition method of the mobile terminal according to an embodiment of the present invention. The database stores information for determining the meaning of the voice instruction, and a plurality of databases may be configured according to the characteristics of the information. Information of each database configured according to the characteristics of information may be updated through a continuous learning process under the control of the controller 180.

The learning process for the databases refers to matching a voice pronounced by the user to a corresponding word. For example, if the user has pronounced 'waiting' but it is recognized as 'eighteen', the user may correct 'eighteen' into 'waiting', so that the controller 180 recognizes the same pronunciation made afterwards as 'waiting'. Through such a learning process, a plurality of voice information may be matched to information in the databases.

For example, the databases may include a first database 161 for storing voice information allowing the user's voice input through the microphone to be recognized by format, syllable, or morpheme, a second database 162 for storing information (e.g., grammar, accuracy of pronunciation, sentence structure) allowing the controller 180 to determine the overall meaning of a voice instruction based on the recognized voice information, a third database 163 for storing information related to a menu for performing a function or a service of the mobile terminal, and a fourth database 164 for storing a message or voice information to be output from the mobile terminal for user's acknowledgement with respect to a meaning of the determined voice instruction. The third database 163 may specify information related to menus of a particular category according to an information domain set for recognizing the above-described voice instruction. Each database may store voice (pronunciation) information or format, syllable, morpheme, a word, a keyword, or sentence information corresponding to the voice (pronunciation) information.

Accordingly, the controller 180 can determine the meaning of the voice instruction by using at least one of the plurality of databases 161 to 164, and execute a menu related to a function or service corresponding to the determined meaning of the voice instruction. In addition, in the present invention, an operation state or an operation mode in which the voice instruction recognition function or the SST function is applied can be displayed by using an indicator or an icon or a particular shape. When the indicator or the icon is outputted, a particular sound or voice may be outputted for user's information.

Figure 11:
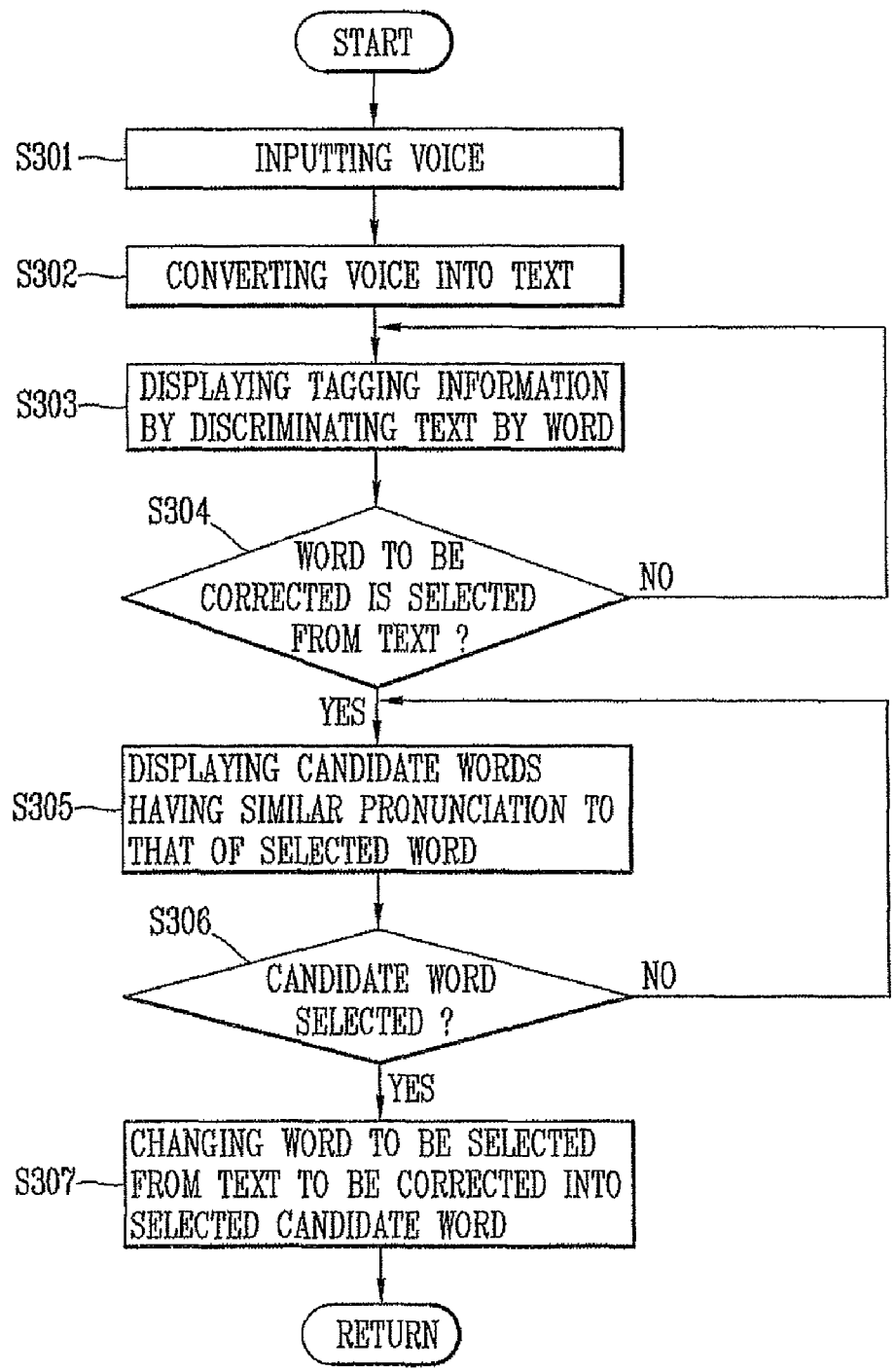
FIG. 11 is a flow chart illustrating the process of a text correcting method of the mobile terminal according to an embodiment of the present invention.

FIG. 11 is a flow chart illustrating the process of a text correcting method of the mobile terminal according to an embodiment of the present invention. It is assumed that the user executes the text message creation function and creates message content by voice by using the STT function. As shown in FIG. 11, when the user inputs a voice (S301), the controller 180 converts the voice into text and displays it on the screen (S302). In order to convert the voice into the text, the controller may use an arbitrary (or predetermined) voice recognition algorithm.

When the conversion of the voice received from the user into the text is completed, the controller 180 discriminately (or individually) tags the text in units of word (e.g., by word) (S303). The tagging information is displayed only on the screen. When the tagging information is stored, it is not stored together with the text. The tagging information may be automatically displayed when the voice is converted into the text by the STT function, or may be displayed whenever a pre-set particular instruction is inputted by the user. The tagging information may be displayed as number, and tagging may be made by a sentence or a screen basis. For example, if there are a plurality of text-converted sentences, only a selected sentence is tagged or only sentences displayed on a current screen are tagged.

If there is an erroneously converted word in the text, the user may select one of the tagging information to correct the erroneously converted word (S304). In order to select one of the tagging information, the user may use a pre-set key, a touch, an access, a finger gesture, a pressure applied to a particular portion, a posture (tilt direction), or a voice instruction.

After the tagging information is displayed, the controller 180 selects a word corresponding to the tagging information inputted by using various methods by the user. For example, if the user inputs '3' as tagging information through one of the various methods, a word corresponding to the tagging information '3' is selected. The selected word is emphatically displayed over the other words. Then, words (referred to as 'candidate words', hereinafter) having a similar pronunciation to that of the selected word (S306) are displayed. For example, if the selected word is 'eighteen', then, 'eighteenth', 'waiting', 'meeting', or the like, may be displayed as candidate words having the similar pronunciation. In this case, the candidate words may not have been previously set in a database, and words having a particular recognition rate or higher that are recognized in the voice recognition step may be sequentially displayed, starting from one having the highest recognition rate.

If one of the candidate words is selected by the user (S306) (e.g., waiting), the controller 180 may change the word (e.g., eighteen) selected from the text to the selected candidate word (e.g., waiting) (S307). In order to select one of the candidate words, the user may use a pre-set key, a touch, an access, a finger gesture, a pressure applied to a particular portion, a posture (tilt direction), or a voice instruction.

The process of changing a particular word in the text to a candidate word may be repeatedly performed, and when correction of the erroneous word is completed, the tagging information is not displayed. When the text is stored, the controller 180 may determine that the correction is completed, and the text correction may be completed by using the above-described various input methods.

Figure 12A:
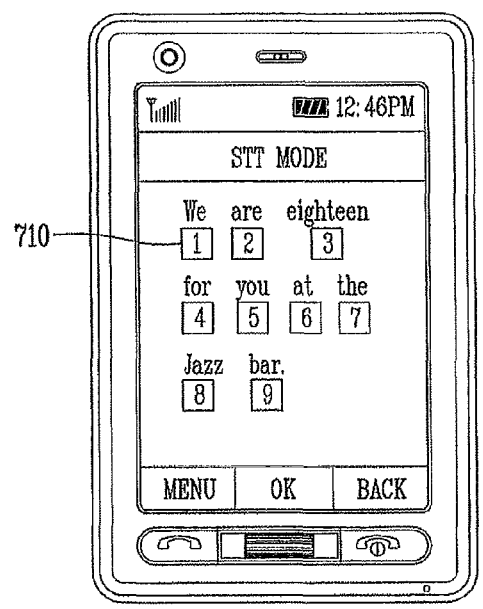
FIGS. 12A to 12C are overviews of display screens illustrating a method for tagging voice-recognized text in the mobile terminal according to an embodiment of the present invention.
Figure 12B:
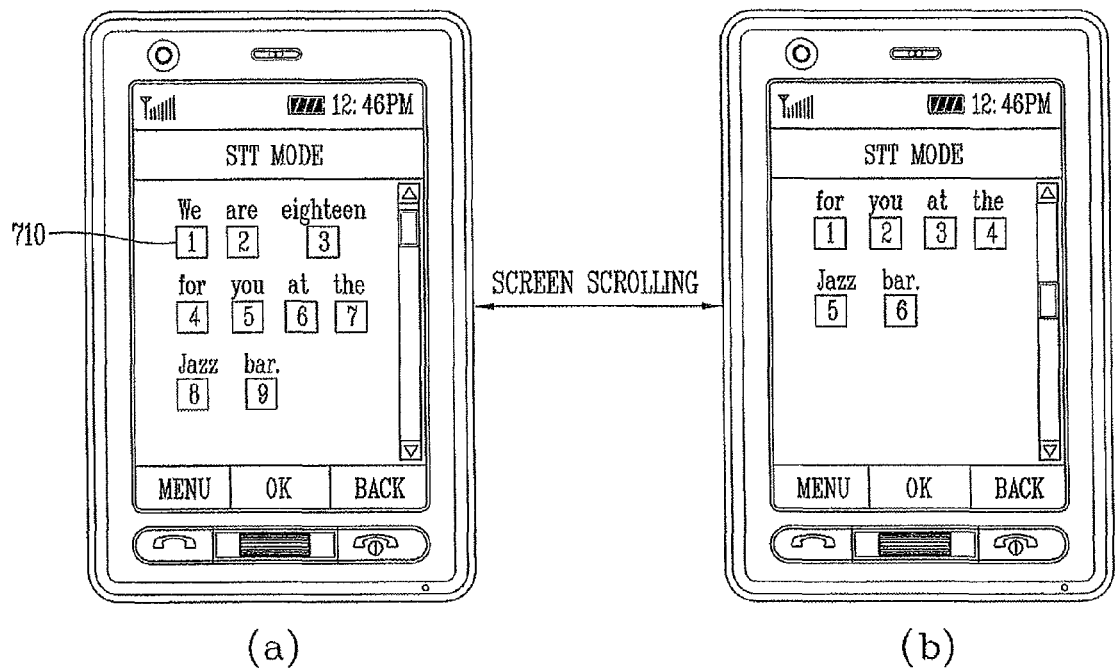
Figure 12C:
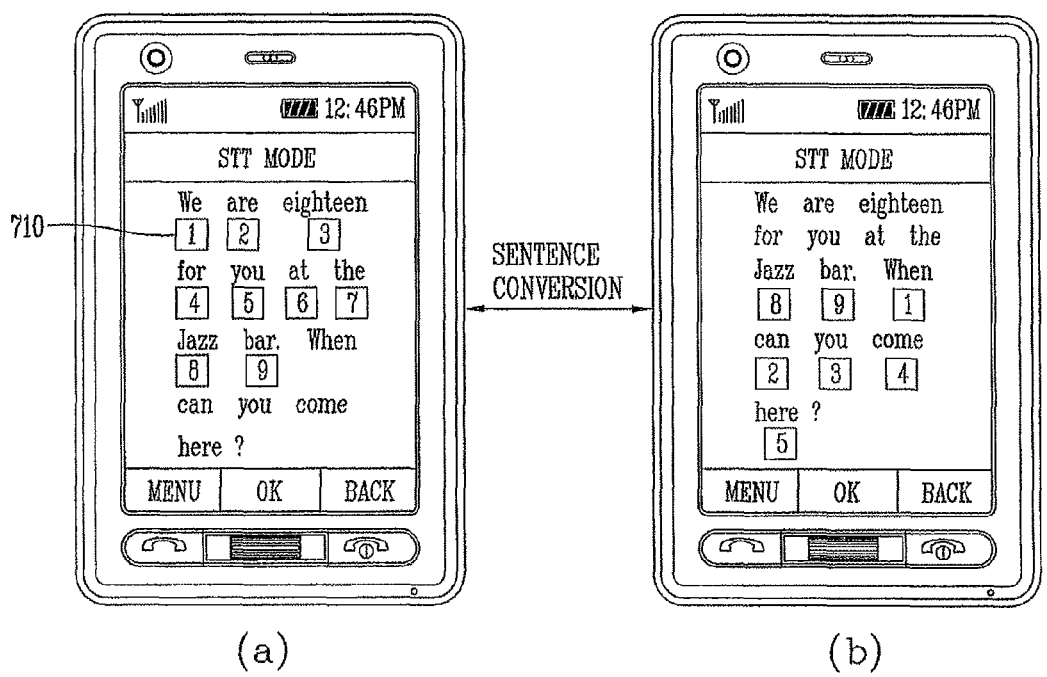

FIGS. 12A to 12C are overviews of display screens illustrating a method for tagging voice-recognized text in the mobile terminal according to an embodiment of the present invention. For example, when the user executes the text message or e-mail creation function in the mobile terminal and inputs the message content by voice, the controller 180 converts a voice inputted by the user into text by using the STT algorithm stored in the memory 160, and displays the converted text on a text message or e-mail creation screen, for example.

As shown in FIG. 12A, the controller 180 displays tagging information of the converted text by each word (710). The tagging information may be displayed at a lower or upper end of each word or may be displayed to overlap with each word. When the tagging information is displayed to overlap with each word, the transparency of the word or tagging information may be adjusted. In addition, the shape or color of the tagging information may be displayed to be different from the text. The tagging information may be automatically displayed when the voice input of the user is completed or when a pre-set particular instruction is inputted by the user.

As shown in FIG. 12B, the words of the text displayed in a single screen may be sequentially numbered. Thus, when the words of the text displayed in the single screen are scrolled, the tagging information may be changed to number of the newly numbered words. Alternatively, subsequently sequential numbers may be used for the words of the text displayed in the next screen.

As shown in FIG. 12C, when there are a plurality of sentences in a single screen, the controller 180 may display tagging information by sentence. For example, tagging information may be displayed only for a sentence selected by the user. In order to select a sentence for which tagging information is to be displayed, the user may use a pre-set key, a touch, an access, a finger gesture, a pressure applied to a particular portion, a posture (tilt direction), or a voice instruction.

Figure 13:
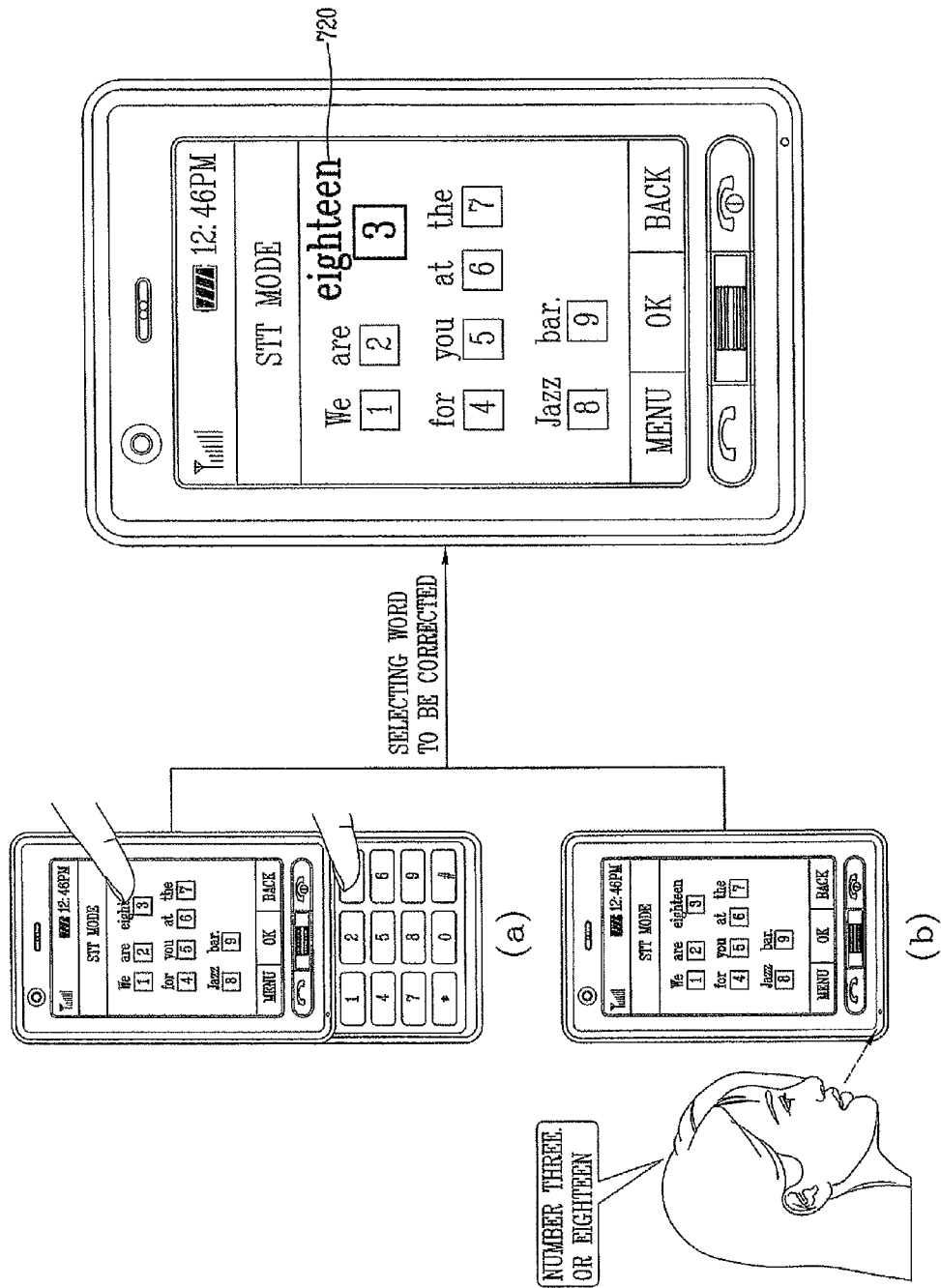
FIG. 13 is an overview of display screens illustrating a method for selecting an arbitrary word to correct text displayed on the screen of the mobile terminal according to an embodiment of the present invention.

FIG. 13 is an overview of display screens illustrating a method for selecting an arbitrary word to correct text displayed on the screen of the mobile terminal according to an embodiment of the present invention. As described above, the text has the tagging information by words. Thus, the user may select a word by inputting one of the tagging information according to a pre-set method.

For example, as shown in FIG. 13(a), the controller 180 selects a word corresponding to tagging information inputted by the user by using a pre-set key, a touch, an access, a finger gesture, a pressure applied to a particular portion, or a posture (tilt direction). The controller then emphatically displays the selected word over the other words (720). For example, if the user inputs tagging information '3' by using the above-described various methods, a word corresponding to the tagging information '3' is selected. Then, the color or brightness of the selected word may be changed, or the selected word may be displayed to be thicker or larger, displayed in a blinking manner, or may be underlined.

As another example, as shown in FIG. 13(b), the controller may immediately receive the word corresponding to the tagging information from the user by voice command. Likewise, the controller 180 may emphatically display the received word over the other words. When an arbitrary word of the text is selected, the controller 180 displays words having a similar pronunciation (referred to as 'candidate words', hereinafter) to that of the selected word.

Figure 14:
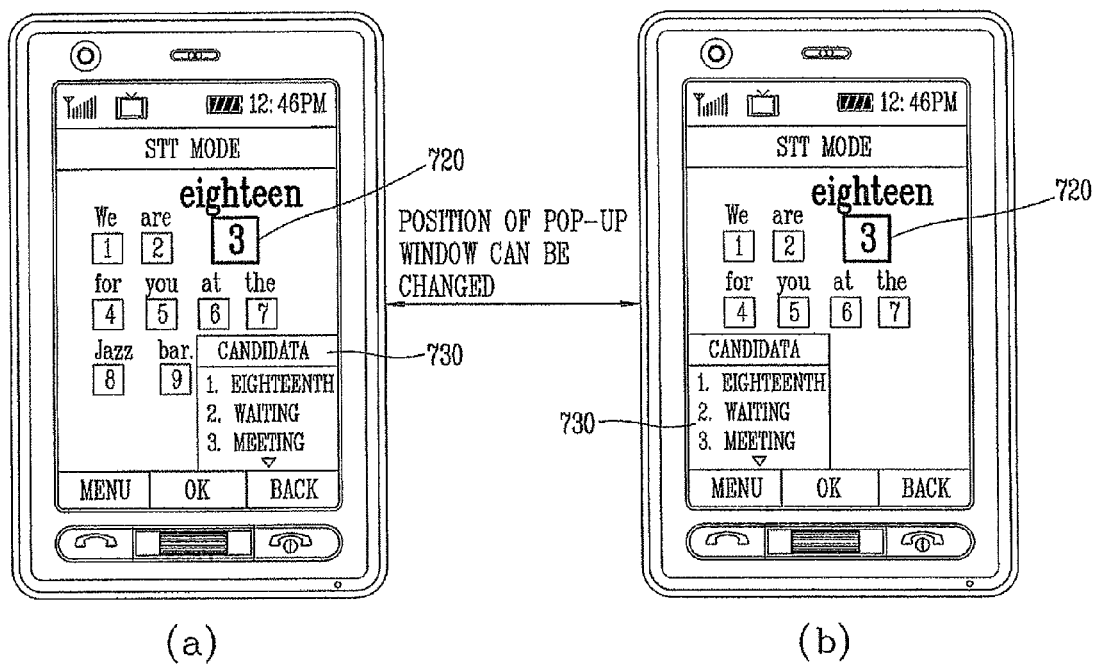
FIG. 14 is an overview of display screens illustrating a method for displaying candidate words for a particular word selected by a user in text displayed on the screen of the mobile terminal according to an embodiment of the present invention.

FIG. 14 is an overview of display screens illustrating a method for displaying candidate words for a particular word selected by a user in text displayed on the screen of the mobile terminal according to an embodiment of the present invention. Candidate words with respect to the selected particular word may be displayed as a pop-up window at one region of the screen, and the display position of the pop-up window may be changed according to the position of the selected particular word. For example, if the selected word is 'eighteen', the candidate words (eighteen, waiting, meeting) having a similar pronunciation to that of the selected word may be displayed on the pop-up window (730). In this case, the candidate words displayed on the pop-up window may be displayed starting from one having the highest voice recognition rate (e.g., having a value indicative of being closest to the selected word).

Figure 15A:
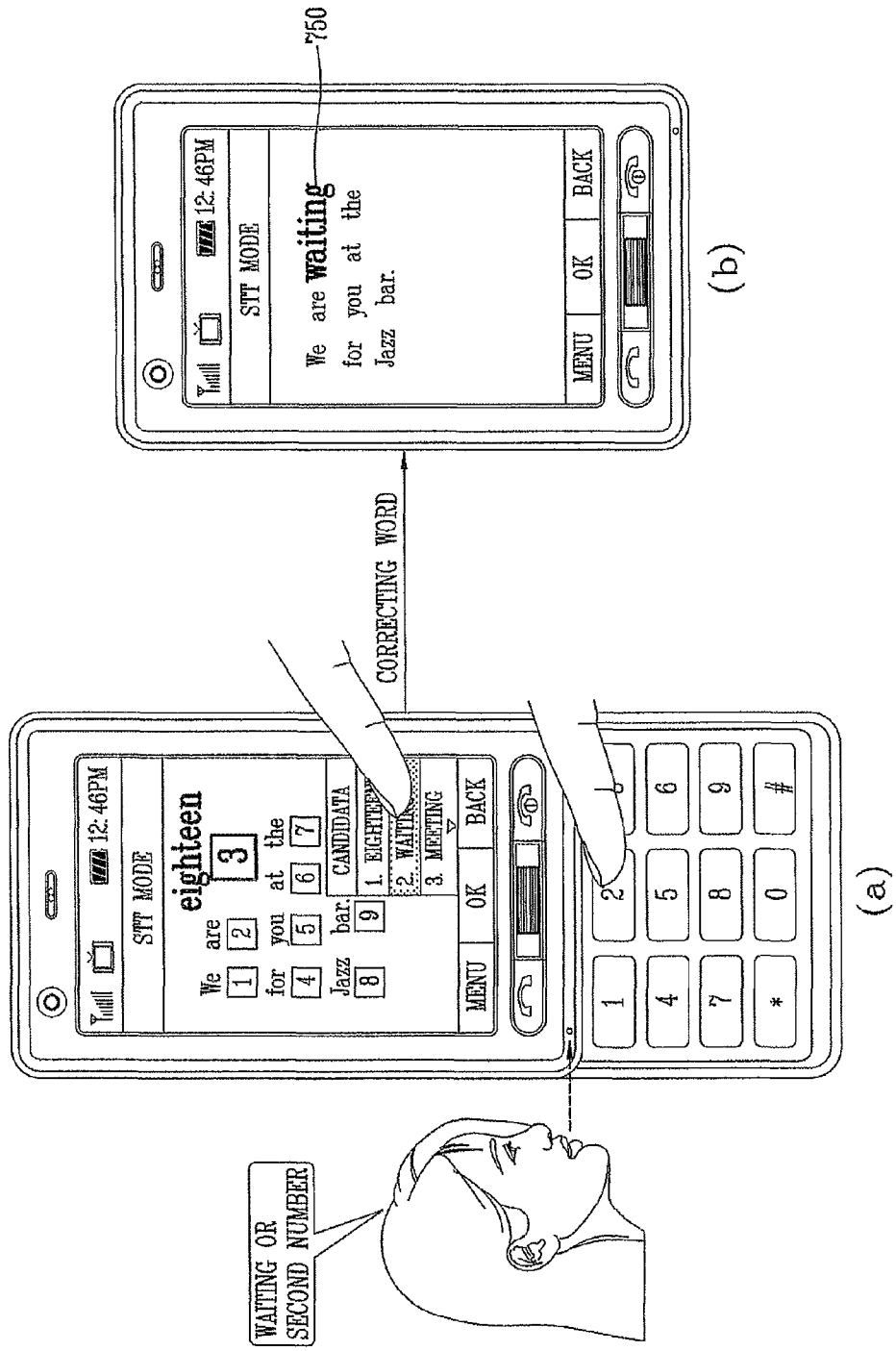
FIGS. 15A and 15B are overviews of display screens illustrating a method for changing a word of text by selecting one of candidate words displayed on the mobile terminal according to an embodiment of the present invention.
Figure 15B:
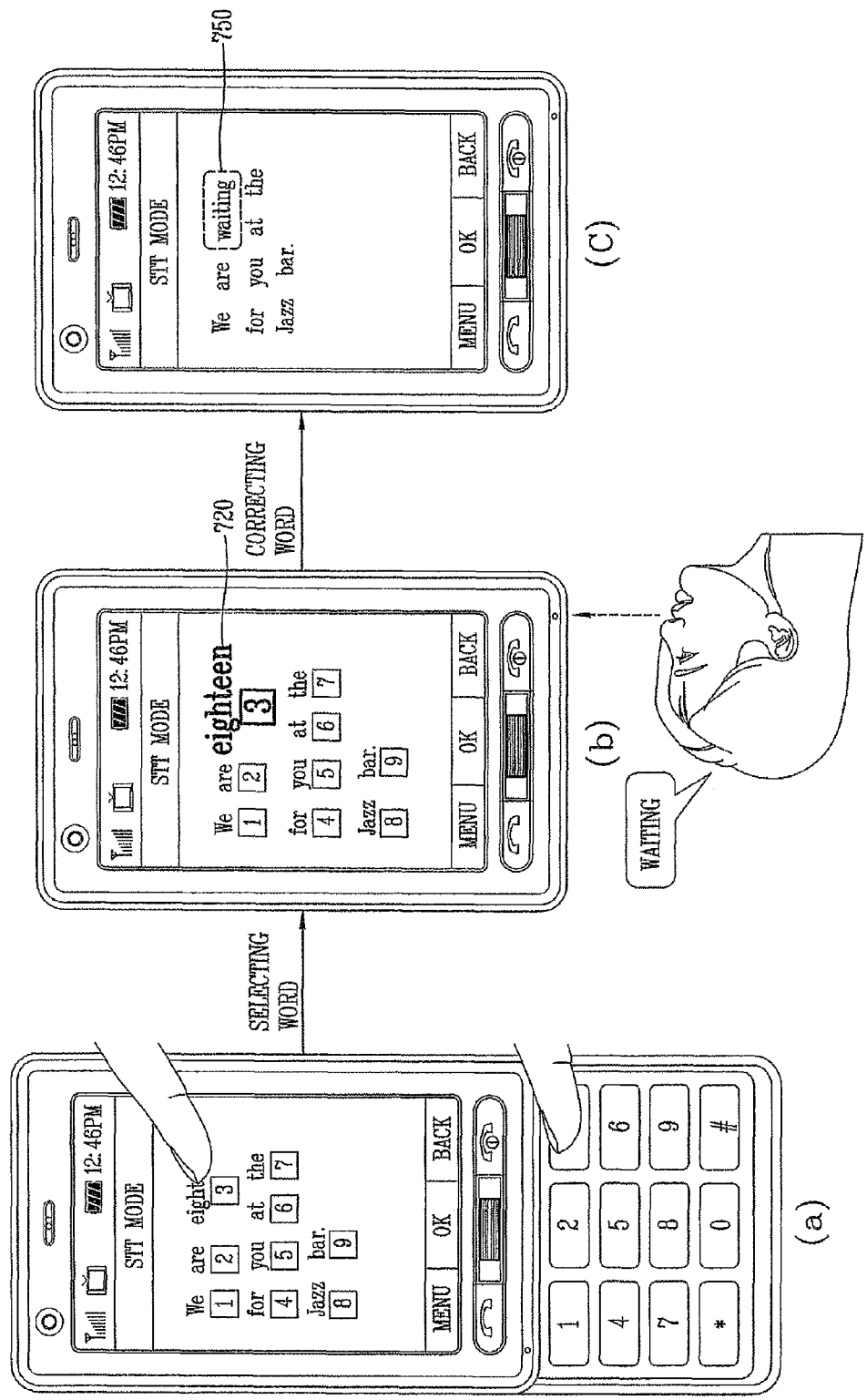

When the candidate words are displayed, as shown in FIGS. 15A and 15B, the user may select one of them and change the selected word. Namely, as shown in FIG. 15A, when the user selects one (e.g., waiting) of the candidate words by using a pre-set key, a touch, an access, a finger gesture, a pressure applied to a particular portion, a posture (tilt direction), or a voice (740), the controller changes the word (e.g., eighteen) selected from the text to the selected candidate word (e.g., waiting). When the candidate word is selected, the controller 180 may delete the pop-up window 730, and when changing of the word (eighteen) selected from the text to the candidate word (waiting) is completed, the controller 180 may emphatically display (or emphasize) the changed word (waiting) over the other words in the text (750).

As shown in FIG. 15B(a), when the user selects the word (e.g., eighteen) to be corrected from the text by using an arbitrary key or touch, and inputs by voice the word (e.g., waiting) to correct the selected word as shown in FIG. 15B(b), the controller 180 immediately changes the word (eighteen) selected from the text to the voice-inputted word (waiting) as shown in FIG. 15B(c). When correction of the selected word in the text is completed, tagging information need not be displayed. If there is any additional word to be corrected in the text, tagging information may be manually displayed by using one of the above-described various input methods. The process of selecting one of the candidate words and changing the word to be corrected in the text to the selected candidate word may be repeatedly performed.

Figure 16:
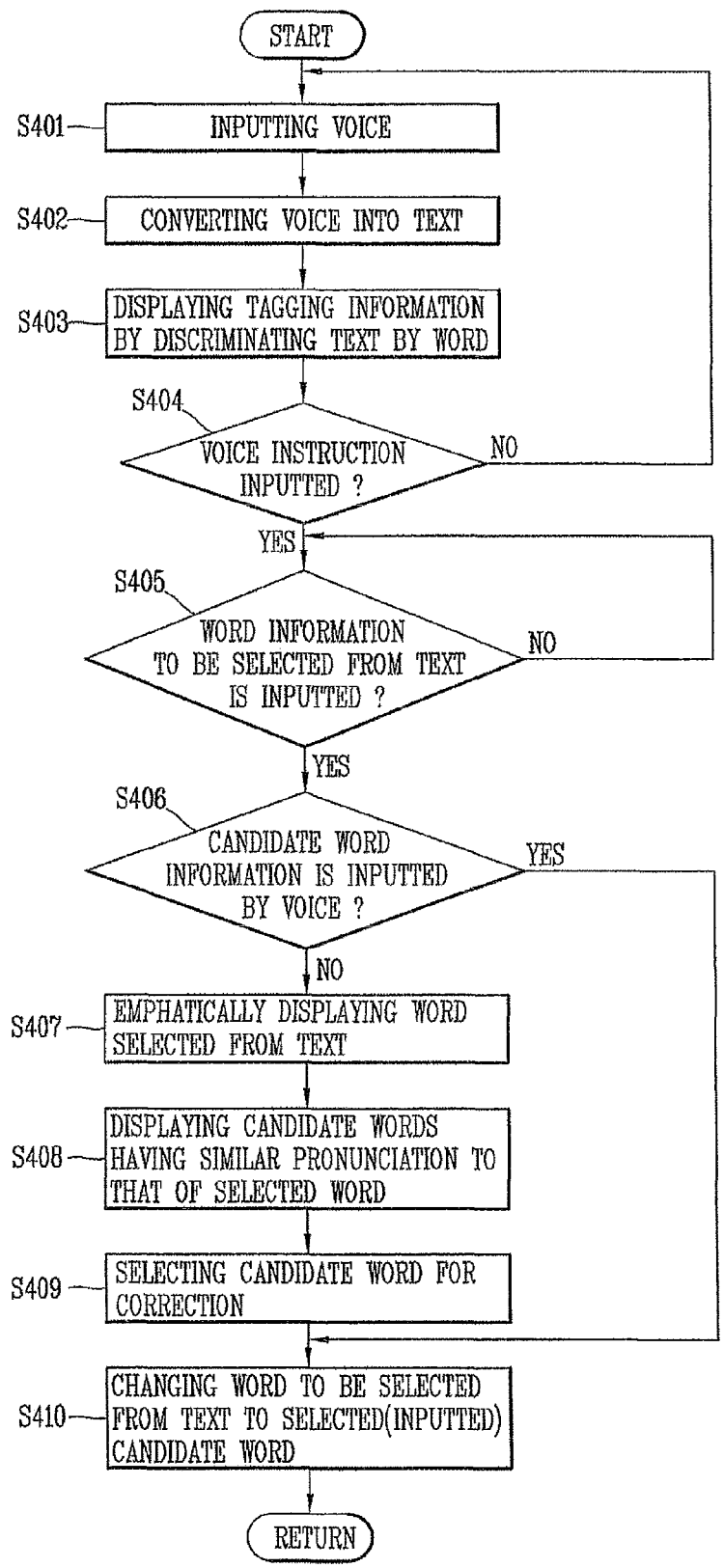
FIG. 16 is a flow chart illustrating the process of a method for correcting text by using voice instruction in the mobile terminal according to an embodiment of the present invention.

FIG. 16 is a flow chart illustrating the process of a method for correcting text by using voice instruction in the mobile terminal according to an embodiment of the present invention. As described above, when the user inputs a voice (S401), the controller 180 converts the voice into text (S402) and displays the text by tagging it by word (S403). If there is an erroneously converted word in the converted text, the user can select the erroneously converted word to correct it.

The controller 180 may receive a voice instruction from the user to correct the erroneously converted word (S404). In addition, a word to be corrected in the text may be selected by voice. In addition, tagging information displayed at the word to be corrected in the text may be received. For example, a pre-set instruction (e.g., the word "modify") may be received as the voice instruction. The voice instruction may have a meaning of an instruction for instructing a correction and a meaning of an instruction for selecting a word to be corrected. Following the voice instruction, a word (e.g., eighteen) desired to be selected by the user may be successively received from the user (S405).

When the word to be corrected is selected by the voice instruction, the controller emphatically displays the selected word over the other words (S407). The method for emphatically displaying the selected word may be one of the plurality of emphatically displaying methods as described above. When the word to be corrected in the text is selected by voice, the controller 180 displays candidate words having a similar pronunciation to that of the selected word (S408).

When the user selects one (e.g., waiting) of the candidate words (S409), the controller 180 changes the word (e.g., eighteen) selected from the text to the one (waiting) selected from the candidate words (S410). If the user successively inputs the voice instruction (modify), the word (eighteen) to be selected from the text, and the word (waiting) for correcting the selected word by voice (S406), the controller 180 immediately changes the selected word (eighteen) to the word (waiting) for correction (S410).

Figure 17:
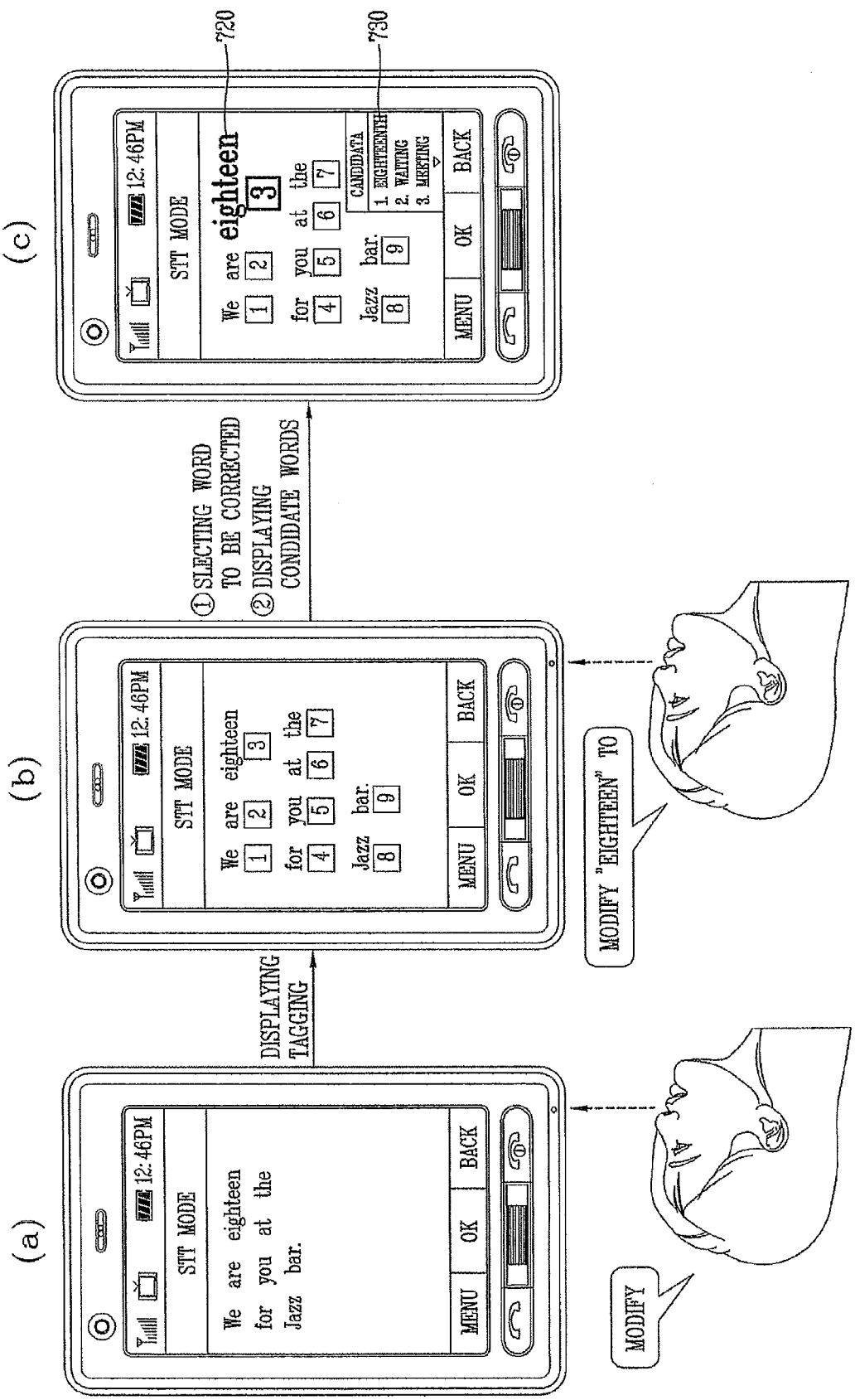
FIG. 17 is an overview of display screens illustrating a method for selecting an arbitrary word by using a voice instruction from text displayed on the screen of the mobile terminal according to an embodiment of the present invention.

FIG. 17 is an overview of display screens illustrating a method for selecting an arbitrary word by using a voice instruction from text displayed on the screen of the mobile terminal according to an embodiment of the present invention. As shown in FIG. 17(a), when conversion of the voice inputted by the user into text is completed and the user inputs a voice instruction for correcting the converted text, the controller 180 displays tagging information of the converted text by word as shown in FIG. 17(b).

Then, the controller selects a word corresponding to tagging information or word information successively inputted by the user from the text and emphatically displays the selected word to be corrected over the other words. For example, when an instruction for correcting the text and a word to be corrected in the text are received by voice from the user, the controller 180 may change the color or brightness of the selected word, display the selected word to be thicker or larger than other words, or blink or underline the selected word to emphasize the selected word. Other ways of emphasizing the selected words are possible. When an arbitrary word in the text is selected, as shown in FIG. 17(*c*), the controller 180 displays candidate words having a similar pronunciation to that of the selected word.

Figure 18A:
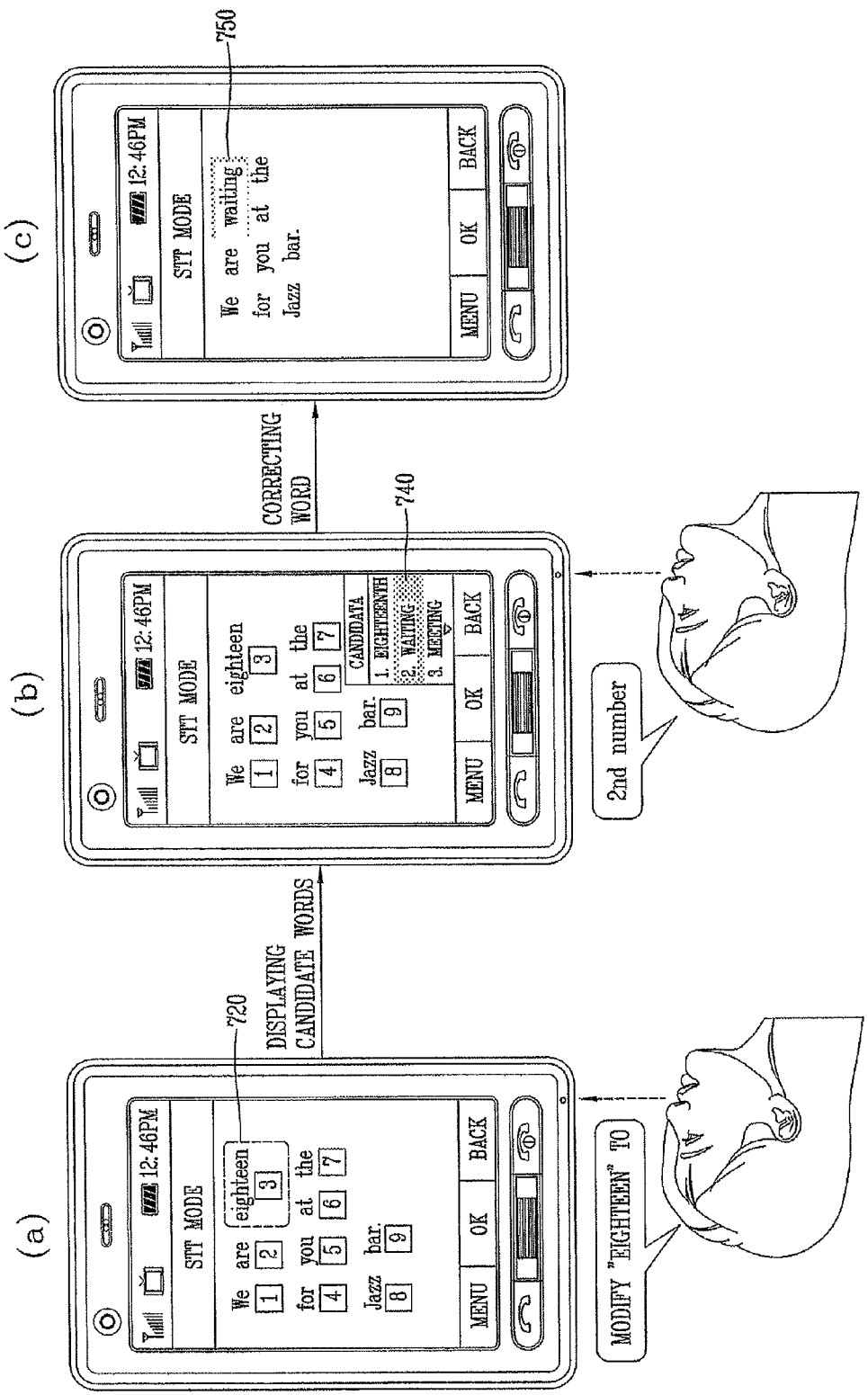
FIG. 18A is an overview of display screens illustrating a method for selecting by voice one of candidate words displayed on the screen of the mobile terminal according to an embodiment of the present invention.
Figure 18B:
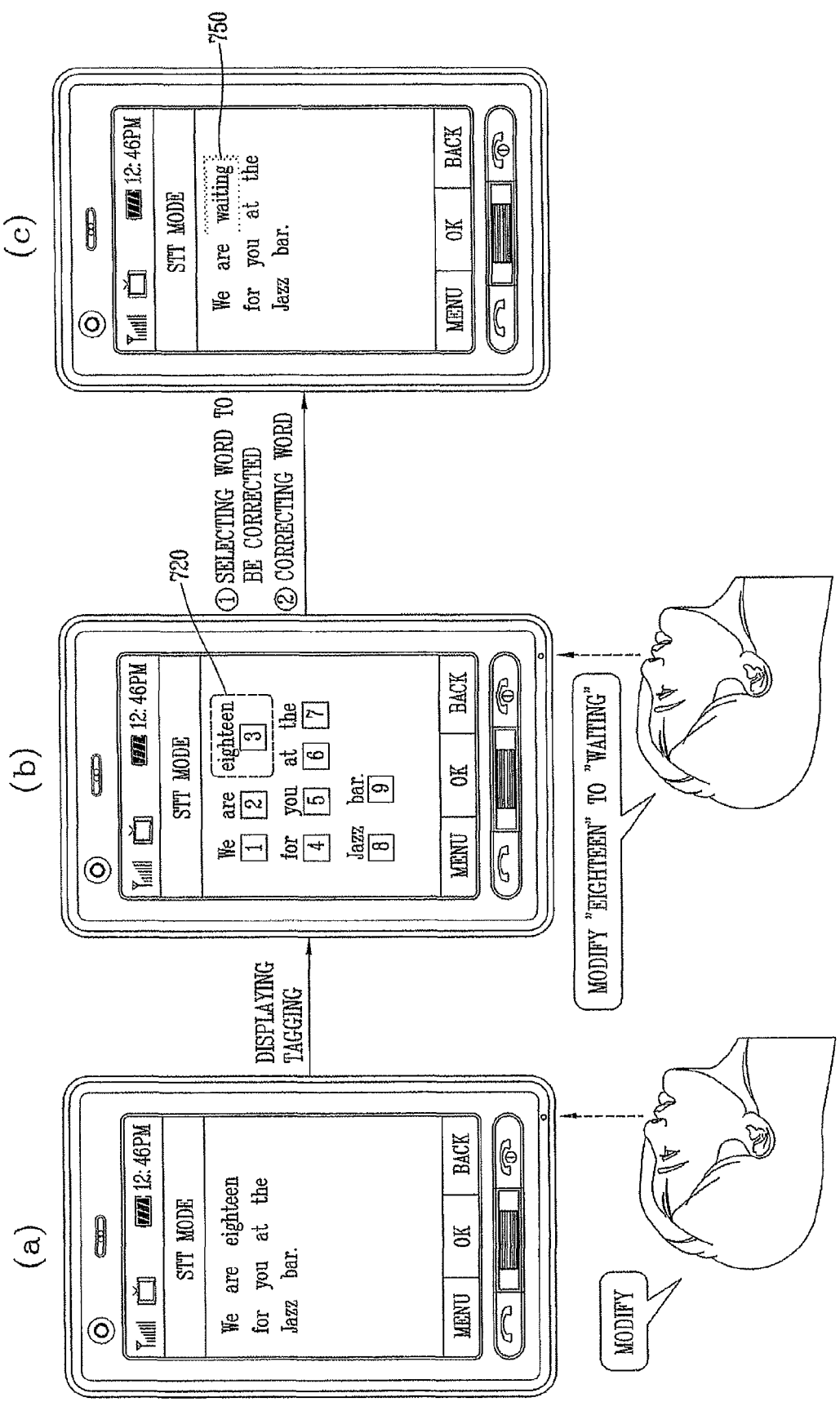
FIG. 18B is an overview of display screens illustrating a method for selecting by voice an arbitrary word from text displayed on the mobile terminal and correcting it according to an embodiment of the present invention.

FIG. 18A is an overview of display screens illustrating a method for selecting by voice one of candidate words displayed on the screen of the mobile terminal according to an embodiment of the present invention, and FIG. 18B is an overview of display screens illustrating a method for selecting by voice an arbitrary word from text displayed on the mobile terminal and correcting it according to an embodiment of the present invention. As shown in FIG. 18A(a), when conversion of the voice inputted by the user into text is completed and the user inputs a voice instruction for correcting the converted text and a word to be corrected, the controller 180 displays candidate words having a similar pronunciation to that of the word to be corrected as shown in FIG. 18A(b). The candidate words may be displayed as a pop-up window on one region of the screen, and the display position of the pop-up window may be changed according to the position of the selected particular word.

With the candidate words displayed, when the user selects one (e.g., 'waiting') of the candidates by voice, the controller 180 changes the selected word (e.g., 'eighteen') to the selected candidate word (waiting) as shown in FIG. 18A(c). When the user inputs the voice instruction (modify) as shown in FIG. 18B(a) and then continuously input by voice the word (eighteen) to be selected from the text and then the word (waiting) for correcting the selected word as shown in FIG. 18B(b), the controller 180 immediately changes the selected word (eighteen) to the word (waiting) for correction as shown in FIG. 18B(c). When the word (eighteen) selected from the text is completely changed to the candidate word (waiting), the controller 180 may emphatically display the changed word (waiting) over the other words in the text. In various embodiments, the selected word, such as eighteen, is already correctly spelled, when it is changed with the selected candidate word.

In an embodiment of the present invention, the above-described method can be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. In addition, the computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
 a display unit;
 an input unit;
 a memory; and
 a controller configured to:
 convert a voice message into text upon detection thereof;
 display on the display unit the text and tags associated with the text, wherein each word of the text is tagged with a different one of the tags, wherein the tags are numbered in an increasing order from a beginning of the text toward an end of the text, and wherein the tags are renumbered when the text is scrolled;
 display on the display unit a word and at least one candidate word having a similar pronunciation to that of the word when the word is selected for correction from the text in response to an access to a tag associated with the word; and
 replace the word on the text displayed on the display unit with a candidate word when the candidate word is selected from the at least one candidate word.

2. The mobile terminal of claim 1, wherein the tags are displayed immediately above or below the text.

3. The mobile terminal of claim 1, wherein the tags are displayed overlapped with the text, and transparency of the tags is adjusted such that the text can be seen through the tags.

4. The mobile terminal of claim 1, wherein the input unit is configured to receive a key input, a touch input, a finger gesture input, a pressure input applied to a particular portion of the display unit, a posture input, or a voice input.

5. The mobile terminal of claim 1, wherein the text comprises a sentence.

6. The mobile terminal of claim 1, wherein the access to the tag associated with the word is performed upon detection of a touch input to the tag associated with the word.

7. The mobile terminal of claim 1, wherein the access to the tag associated with the word is performed upon detection of a voice input selecting the tag associated with the word.

8. A method of a mobile terminal, the method comprising:
 converting a voice message into text when the voice message is detected and processed by a controller of the mobile terminal;
 displaying the text and tags associated with the text on a display unit of the mobile terminal, wherein each word of the text is tagged with a different one of the tags, wherein the tags are numbered in an increasing order from a beginning of the text toward an end of the text, and wherein the tags are renumbered when the text is scrolled;
 displaying a word and at least one candidate word having a similar pronunciation to that of the word on the display unit when the word is selected for correction from the text in response to an access to a tag associated with the word; and
 replacing the word on the text displayed on the display unit with a candidate word when the candidate word is selected from the at least one candidate word.

9. The method of claim 8, wherein the tags are displayed immediately above or below the text.

10. The method of claim 8, wherein the tags are displayed overlapped with the text, and transparency of the tags is adjusted such that the text can be seen through the tags.

11. The method of claim 8, wherein the input unit is configured to receive a key input, a touch input, a finger gesture input, a pressure input applied to a particular portion of the display unit, a posture input, or a voice input.

12. The method of claim 8, wherein the text comprises a sentence.

13. The method of claim 8, wherein the displaying the word comprises emphatically displaying the word when the word is selected for correction.

14. The method of claim 13, wherein the emphatically displaying the word comprising distinguishing the word from remaining words of the text through modifying at least one of color, brightness, size, thickness, or presentation of the word.

15. The method of claim 8, wherein the replacing the word comprises emphatically displaying the candidate word when the candidate word is selected from the at least one candidate word.

16. The method of claim 8, wherein the access to the tag associated with the word is performed upon detection of a touch input to the tag associated with the word.

17. The method of claim 8, wherein the access to the tag associated with the word is performed upon detection of a voice input selecting the tag associated with the word.

18. The method of claim 8, wherein the converting the voice message into the text is performed using a speech to text (STT) function.

19. The method of claim 8, wherein the displaying the at least one candidate word having the similar pronunciation comprises displaying the at least one candidate word in an order of similarity to the word selected for correction.

* * * * *